United States Patent
Li et al.

(10) Patent No.: US 7,136,832 B2
(45) Date of Patent: Nov. 14, 2006

(54) SUPPLY CHAIN VISIBILITY FOR REAL-TIME TRACKING OF GOODS

(75) Inventors: Xi Li, Sunnyvale, CA (US); Keng-shao Chang, San Jose, CA (US); John J. Dooley, Mountain View, CA (US); Abhijit A. Deshpande, Fremont, CA (US); Thomas Alan Greene, Santa Cruz, CA (US); Darren Jeffrey Hakeman, San Mateo, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 805 days.

(21) Appl. No.: 09/849,510

(22) Filed: May 4, 2001

(65) Prior Publication Data
US 2002/0111819 A1    Aug. 15, 2002

Related U.S. Application Data

(60) Provisional application No. 60/254,125, filed on Dec. 7, 2000.

(51) Int. Cl.
G06F 17/60    (2006.01)
G08B 26/00    (2006.01)
(52) U.S. Cl. .......................................... 705/34; 340/505
(58) Field of Classification Search .................. 705/28, 705/22–26, 27, 500, 34; 340/505
See application file for complete search history.

(56) References Cited

U.S. PATENT DOCUMENTS 5,930,777 A * 7/1999 Barber .......................... 705/40

(Continued)

FOREIGN PATENT DOCUMENTS

EP    0 962 877    12/1999

(Continued)

OTHER PUBLICATIONS

PCT International Search Report, PCT/US01/46741, International filing date Nov. 30, 2001, priority date Dec. 7, 2000, date mailed Mar. 7, 2002.

(Continued)

Primary Examiner—Igor N. Borissov
(74) Attorney, Agent, or Firm—Fenwick & West LLP

(57) ABSTRACT

A commerce visibility network allows for the collection and distribution of real-time location and status information regarding the movement of goods and assets through a supply chain. Items and/or conveyances may be individually tagged using radio frequency identifiers or other tagging technologies, such as global positioning satellite technology. The location of an item or conveyance may be marked and information on the location may be stored at a site server. The site server may then upload location information to a data center. Supply chain users may then be charged a fee per tracked item or fee per transaction to access the data center and view reports compiled using the location information regarding each tracked item. This allows for instantaneous access to location and status information of any item in the supply chain. Additionally, aggregation information is provided to allow for the tracking of items which are stored in conveyances, even in several levels of conveyances. Compensation logic is applied to the asset movement data to provide a continuous knowledge of the asset locations, so as to compensate for deficiencies in the raw location data.

49 Claims, 12 Drawing Sheets

U.S. PATENT DOCUMENTS

| | | | |
|---|---|---|---|
| 6,211,781 B1 * | 4/2001 | McDonald | 340/505 |
| 6,243,450 B1 * | 6/2001 | Jansen et al. | 705/400 |
| 6,285,916 B1 * | 9/2001 | Kadaba et al. | 700/222 |
| 6,396,413 B1 * | 5/2002 | Hines et al. | 340/825.49 |
| 6,539,360 B1 * | 3/2003 | Kadaba | 705/28 |
| 6,801,833 B1 * | 10/2004 | Pintsov et al. | 700/223 |
| 7,019,642 B1 * | 3/2006 | Nelson et al. | 340/539.1 |
| 2001/0040512 A1 * | 11/2001 | Hines et al. | 340/825.49 |
| 2002/0029178 A1 * | 3/2002 | Wiederin et al. | 705/34 |

FOREIGN PATENT DOCUMENTS

| | | |
|---|---|---|
| TW | 470901 | 1/2002 |

OTHER PUBLICATIONS

Yogesh V. Joshi, "Information Visibility and Its Effect on Supply Chain Dynamics", Massachusetts Institute of Technology, Jun. 2000, pp. 1-67, XP-002202754.

"1999 RFID Industry News Archive", 1999, pp. 1-7, XP-002202755.

RFID Technologies CC, "RFID-What is it and How is it Used?", May 14, 2000, pp. 1-4, XP-002202757.

Gross & Associates, "Perspectives in Productivity", vol. 13, No. 1, Winter 1999, pp. 1-4, XP-002202756,

* cited by examiner

SUPPLY CHAIN VISIBILITY FOR REAL-TIME TRACKING OF GOODS

CROSS REFERENCE TO RELATED APPLICATION

This application claims priority based on provisional application Ser. No. 60/254,125, entitled "A Method and System for Real-Time Location and Status of Goods and Assets Throughout a Supply chain", filed Dec. 7, 2000 by Chin Tran, Qun Zhao, Abhijit Deshpande, Mark Li, Thomas Alan Greene, Neal F. Herman, John J. Dooley, Devendra Shiledar, Howard Lee, Ken Chang, Milind Khandekar, Joseph Siufai Chan, Jeffrey F. Bain, Bruno Skracic, Nikola Cargonja and Darren Jeffrey Hakeman.

FIELD OF THE INVENTION

The present invention relates to supply chain management. More specifically, the present invention relates to supply chain visibility for the real-time tracking of goods.

BACKGROUND OF THE INVENTION

Supply chain management is a common problem for any organization that deals with the transportation of a large number of goods over a wide geographic area. Businesses that routinely lose goods or otherwise mismanage their supply chain are doomed to failure. This is especially true for manufacturing companies, where the successfull supply of raw materials to make components, and components to make goods, is essential to survival. Unfortunately, until recently, many of these companies were forced to track goods using manually prepared inventory reports, which required individuals at various locations to check the contents of incoming containers and write down the contents on a clipboard. The reports could then be reviewed if trouble with the transport or inaccuracies later occurred.

With the advent of computers, systems were created that partially automated the collection and/or gathering process. Bar code readers could be used to collect data on incoming goods, but manual intervention was still needed to get inventory information into a form that could be easily transferred to a central location. Data mining techniques were used to collect data from various warehouses using Electronic Data Interchange (EDI) interactions. This data was stored in centralized databases. Errors were still encountered, however, during the manual intervention processes, usually during punching keys on an EDI terminal.

There was also a significant latency problem with the systems used in the past. Data collected by a collection point such as a clipboard or bar code reader would oftentimes not be entered into the EDT for several hours, normally at the end of each business day, and the information would be transferred in batches. This introduced errors of its own, as instantaneous tracking of goods was not available and it was possible for the system to indicate that the same item was in two separate locations at the same time (for example, if the item was shipped from one location to another in the same town during the same day).

Additionally, item tracking was limited to single item tracking. Namely, tracking merely involved indicating when a given container was received, but no mechanism was in place to track the individual items within the container, or items within those items (multi-tiered items). This severely limited the application of the system in the view of companies with more complex tracking needs, where items may be removed from containers at various locations through the supply chain.

What is needed is a system that provides for automated tracking of items without significant latency, and which allows for the tracking of multi-tiered items.

BRIEF DESCRIPTION OF THE INVENTION

A commerce visibility network allows for the collection and distribution of real-time accurate location and status information regarding the movement of goods and assets through a supply chain. Items and/or conveyances may be individually tagged using radio frequency identifiers or other tagging technologies, such as global positioning satellite technology. The location of an item or conveyance may be marked and information on the location may be stored at a Site Server. The Site Server may then upload location information to a Data Center which may be located in a near or distant location. Supply chain users may then be charged a fee per tracked item or fee per transaction to access the Data Center and view reports compiled using the location information regarding each tracked item. This allows for instantaneous access to location and status information of any item in the supply chain. Additionally, aggregation information is provided to allow for the tracking of items which are stored in conveyances, even in many levels of conveyances.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF THE INVENTION

Figure 1:
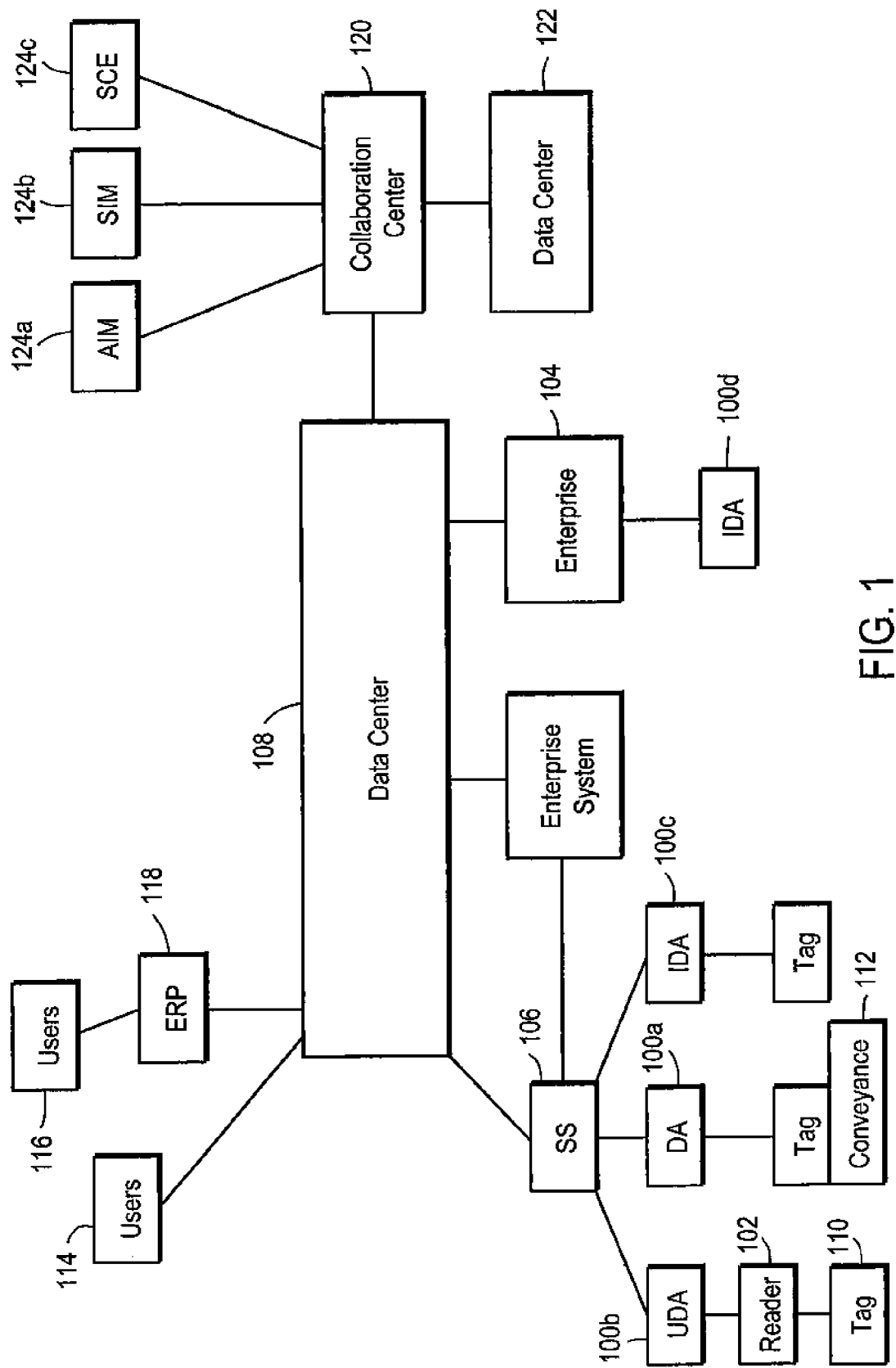
FIG. 1 is a block diagram illustrating a commerce visibility network in accordance with a specific embodiment of the present invention.

Embodiments of the present invention are described herein in the context of a system of computers, servers, communication mechanism, and tags. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Overview/Architecture

A global visibility network is provided which allows for the collection and distribution of real-time accurate location and status data on the movement of goods and assets through a supply chain. Reusable, shared conveyances (such as pallets, containers, cartons, totes, trailers, etc.) may be used to transport the goods through the supply chain. These conveyances are enabled with automatic data collection technologies that provide an accurate description of their contents as well as allow the network to track their progress and status. The system permits the tracking of items which are stored inside conveyances, even in many levels of conveyances. In fact, the number of possible levels of conveyances is unlimited.

Assets include items and conveyances. A conveyance is an asset whose primary function is to transport or store other assets. Conveyances may contain zero, one or more other conveyances (e.g. a pallet containing multiple totes), and zero, one or more items (e.g. a tote containing packages of meat).

Asset tags identify the assets moving through the supply chain. These tags are typically attached directly to the assets and may be implemented using different technologies, including RFID, bar code, or other forms of Automatic Data Collection (ADC) technology.

FIG. 1 is a block diagram illustrating a commerce visibility network in accordance with a specific embodiment of the present invention. Site Servers (SS) 106 are distributed throughout the network. Examples of where an SS might be located include a warehouse, distribution center, or a retail store. Site Servers are devices that are coupled to and manage one or more Data Appliances (DA). The SS communicates with corresponding DAs using the Universal Data Appliance Protocol (UDAP), a suite of protocols providing efficient communication for automatic discovery, installation preparation and administration of DAs, transport of event occurrence information, feature expansion of readers, support for new DAs, readers and workstations, and support for other DA operations. UDAP will be described in more detail later in this document.

Data Appliances are designed to report the movement and/or status of assets. There may be many different categories of DAs installed at sites throughout the network including: integrated DA 100*a* which incorporates tag reader hardware within it; Universal Data Appliance adapter (UDA) 100*b*, which is designed to work with third party hardware such as tag reader 102; and Intransit Data Appliance (IDA) 100*c*, which monitors the location and/or status of assets while they are in transit. An IDA may utilize Global Positioning Satellite (GPS) or similar technologies, coupled with wide-area communication such as cellular or satellite. An IDA may also be coupled to, for example, trailers, intermodal containers or chassis, and rail cars. A separate Enterprise server 104 may be coupled to an IDA network 100*d* to collect and manage the data from networked IDA devices.

Each item to be tracked may include a tag 110 or other automatic data collection technology. The tags may be located on small items such as individual products, and/or conveyances 112 such as boxes, containers, or pallets. As will be described below, a single conveyance may have a tag, and then contain other conveyances and/or items, each of which may contain their own tag. This will allow for the individualized tracking of items despite the fact that they may be located in conveyances which may not be opened until reaching their final destination. The tags may be implemented using different technologies, such as RFID or bar code technologies, and these various technologies may be used together in a single supply chain. Additionally, a single item or conveyance may have more than one tag.

A tag reader 102 or an integrated Data Appliance, DA 100*a* for example, may be used to scan a tag when one of several events occurs. These events may include things such as shipment, receipt, placement into storage, removal from storage, loading into a conveyance, unloading from a conveyance, or replacement of a battery. Thus, when a conveyance is sent from a first warehouse to a second warehouse, a tag reader at the first warehouse indicates that the conveyance is leaving and this information is forwarded to the SS for the first warehouse, and then when the conveyance reaches the second warehouse, a tag reader at the second warehouse indicates that the conveyance has arrived and this information is forwarded to the SS for the second warehouse. The protocol used between the tag reader and the tag will depend on the technology used for the tag. For RFID, the protocol will be a radio frequency protocol.

Figure 2:
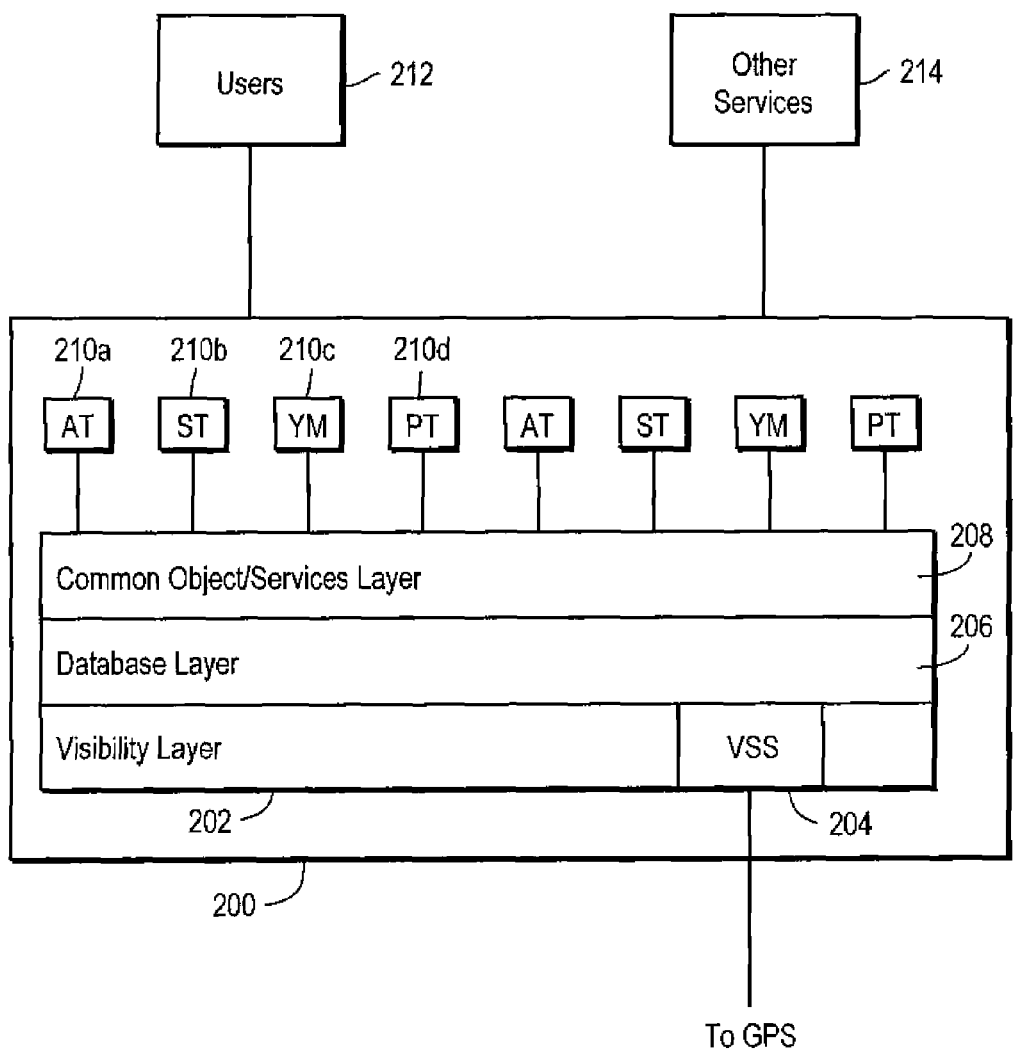
FIG. 2 is a block diagram illustrating a Data Center located at some central point in the network in accordance with a specific embodiment of the present invention.

Data may be collected by a Data Center (DC) 108 located at some point in the network. FIG. 2 is a block diagram illustrating a DC in accordance with a specific embodiment of the present invention. Data Center 200 contains a visibility layer 202, which is a physical layer which interfaces with Site Servers. The visibility layer 202 may also contain a Virtual Site Server 204, which interfaces with an enterprise running GPS or similar technologies. The Virtual Site Server 204 is used because the enterprise does not have a dedicated Site Server and thus certain tasks normally performed by a Site Server before forwarding to the Data Center may not have been performed.

A database layer 206 is used for the storage of the information received at the visibility layer. A common object/services layer 208 then extracts data from the database and uses it with one or more applications 210a, 210b, 210c, 210d. The applications may include asset tracking 210a, shipment tracking 210b, yard management 210c, and conveyance or pallet tracking 210d. The applications may be run for users 212 as well as for other third party services 214 which access the data. These other services may include supply chain planning companies contracted by users to maximize efficiency in their supply chain.

Communications between the SS and the DC utilize a data exchange protocol designed to carry messages containing information about the data being transferred and also modifiers on the request/response semantics. Messages are passed in a format of the XML language so they can be manipulated using well known tree algorithms and parsers. Due to the large volume of data being transferred in applications such as discussed herein, it is important to maximize the efficiency with which the data is transferred and to minimize the connection time between the various elements of the supply chain. In the preferred embodiment, a compact format of the XML language is utilized to meet these requirements.

Referring back to FIG. 1, a user 114 may access data stored in a Data Center through the use of a real-time commerce visibility portal on the Internet, examples of which are commonly termed Internet browsers. Alternatively, event triggered email or fax notification may be enabled. In the preferred embodiment, the Secure Hypertext Transfer Protocol (HTTPS) is used for this purpose. Additionally, a user 116 may wish to have more security or more integration with their own systems than a common portal may provide. In these cases, direct integration to the subscriber's internal business systems may be established using standard enterprise system protocols, for example ERP 118. Alternately, user 116 may wish to utilize supply chain management software (SCM) or other third party service to enhance the design and operation of the supply chain.

A Data Center 108 may be coupled to a collaboration center 120, which may connect one or more Data Centers to each other. This provides for a geographically diverse network with Data Centers dedicated to geographic regions. For example, Data Center 122 may be located on one coast of the United States at a considerable distance from Data Center 108 which may be located on the opposite coast, both communicating through collaboration center 120. In worldwide deployed applications of the supply chain, there may even be multiple collaboration centers coupled to each other. The communication format between collaboration centers may be a format proprietary to the collaboration centers. Additionally, applications such as Asset Information Management software (AIM) 124a, Supply Information Management software (SIM) 124b or other local Supply Chain Execution software (SCE) 124c, may be run on the collaboration centers to further process the data for user purposes.

Figure 3:
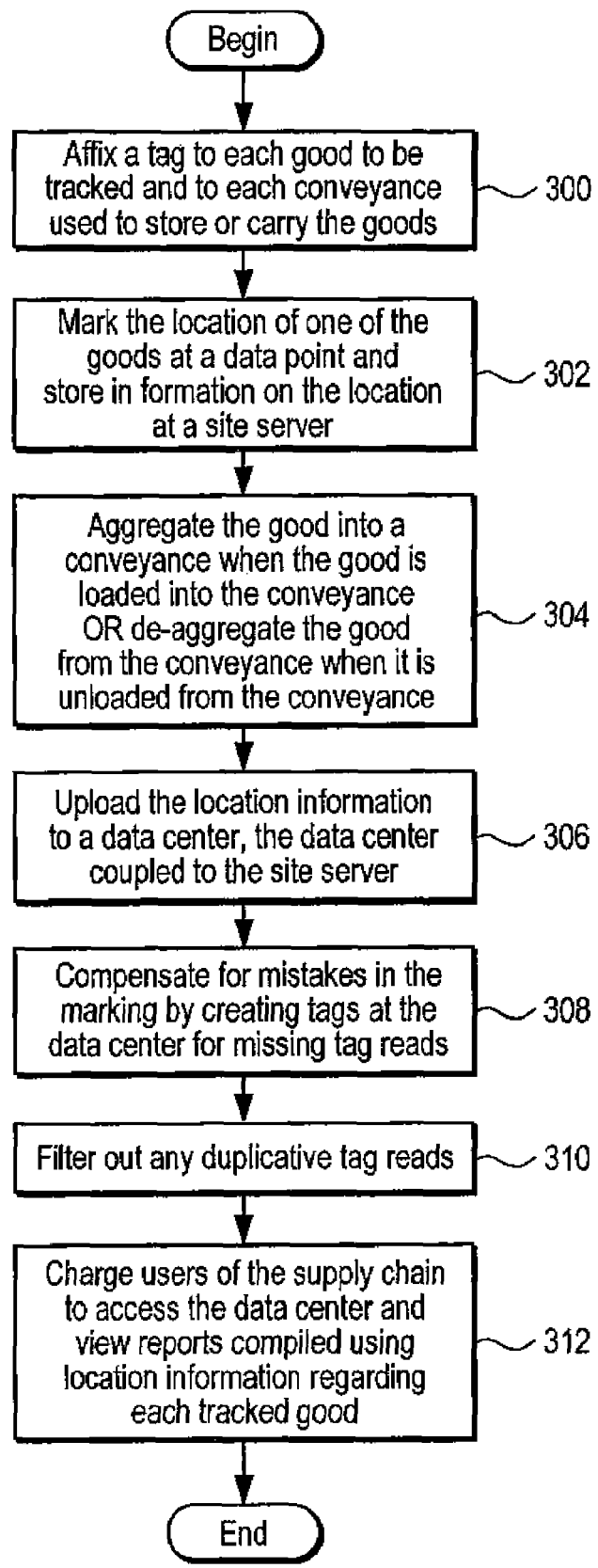
FIG. 3 is a flow diagram illustrating a method for the real-time tracking of goods in a supply chain in accordance with a specific embodiment of the present invention.

FIG. 3 is a flow diagram illustrating a method for the real-time tracking of items in a supply chain in accordance with a specific embodiment of the present invention. At 300, a tag is affixed to each item to be tracked and/or to each conveyance used to store or carry the items. The tag may be an RFID tag. At 302, the location of one of the items is marked at a data point by reading the tag with a tag reader. In order to distinguish data from different data points, each data point will have a unique ID throughout the supply chain. If the tag is an RFID tag, the marking may include reading the tag using an RFID reader. The reader may be a part of, or coupled to, a Data Appliance wherein information on the location is stored at a Site Server coupled to the Data Appliance. At 304, the item may be aggregated into a conveyance when the item is loaded into the conveyance. Correspondingly, it may be de-aggregated from the conveyance when it is unloaded from the conveyance. The marking may also include tracking the one of the items using GPS technology. Additionally, the marking may include marking the aggregation or de-aggregation of the item and including this information in the location information. The storing process may include using the Universal Data Appliance Protocol (UDAP) to communicate location information from the data appliance to the Site Server.

At 306, the location information is uploaded to a Data Center, the Data Center coupled to the Site Server. At 308, any mistakes in the marking, such as missed tags may be compensated for by creating tag reads at the Data Center for missing tag reads. This may include detecting that a missed read has occurred by learning that a tag read was made on the item at a first location and a third location, but not at a second location, wherein the item could not arrive at the third location without first passing through the second location. At 310, any duplicate tag reads may be filtered out. At 312, users of the supply chain are charged to access the Data Center and view reports compiled using location information regarding each tracked item. They may be charged either a fee per item tracked or, alternatively, a fee per transaction, where a transaction includes a single tag read. The Data Center may be connected to the Internet and accessing the Data Center and viewing reports may be accomplished over the Internet using a protocol such as HTTPS, commonly used on the Internet.

Association

Association is the connection between an asset and a tag. A tag can only be associated with a single asset at any given time, but one asset can have multiple tags associated with it. Reading an associated tag will identify the asset. The association process is beneficial for several reasons. First, in order to enable asset visibility, it is necessary to track the asset identity, location and status data throughout a supply chain. In order to track the asset activity, tags are mounted to assets. Data Appliance hardware installed at a data point reads the tags and provides the Data Center with the tag code. The DC then applies association to determine the asset identity, location and status data that provides asset visibility.

Second, it is necessary for physical to logical mapping. A customer identifies assets by identification methods specific to the customer (e.g., serial numbers), however, for tracking purposes the data collection hardware needs tags that it can read. The association process at the DC provides the mapping between the tag mounted on the asset and the customer identification of the asset.

Third, association information is needed to process the tag reads and generate useful information from the tag reads. Once the association is established, the DC can recognize the asset when the corresponding tag is read and generate information from the tag read.

Fourth, association allows for the reduction in the volume of data sent from the data point hardware since once the association is established between a tag and an asset, the hardware needs only to send tag reads instead of tag and asset.

Fifth, association aids in filtration, where duplicate or redundant data sent from the data point is removed. An asset can have multiple tags. When the asset is tracked at a location, the data collection hardware may collect the multiple tags and send the data to the Data Center. However, the system only needs to generate asset activity once for this asset. With association information, the redundant data can be eliminated.

There are three basic operations of association: create an association by appending a new tag to an asset; modify the association by replacing the old tag with a new tag; or delete the tag to asset association. The association process operates at the Data Center when the tag read events arrive from the Data Appliance at a data point. The data point must be configured for the appropriate association activity before the Data Center is able to process events as association or disassociation events. The collected data is checked against the configured activity for the data point and processed accordingly.

An "append association" event creates a unique tag ID and asset ID association for the tag and the customer asset. The association event includes data point ID, association time, asset ID, tag, and asset type. The asset type may be a conveyance or an item. The asset ID is a customer specific identifier used to identify the asset, for example, a serial number or a name. If an association event does not include a customer asset ID, then the association process creates a unique asset ID and associates the tag to the generated asset ID. Asset and tag information is then stored in a database. An association event can include multiple tags mounted on an asset.

Before associating a tag to an asset, various consistency checks will be done. If both the tag and customer asset in the association event are new, the system will create a new tag ID and asset ID association. If both the tag and asset are already in the database and the association exists, then the event is ignored. If the asset is already present in database but the tag is new, then an association is made between new tag ID and asset ID. If the tag is already in the database but the asset is new, then the event is ignored.

In a specific embodiment of the present invention, an append association event is formatted as follows:
event=data-point-id, time-stamp, sequence-no, data-spec, domain-data-spec
  where:
  data-point-id=number
  data-spec=asset-ID, tag-read
    asset-ID=string (can be null)
    tag-read=time-stamp, sequence-no, tag-id, tag-type
  domain-data-spec=XML character string, in the instant example defining a carrier and an asset ID For example, if DP1 is registered with an association activity component configured with append, the following record indicates Asset AAA-001 has two tags, 1000eafd099 and 1000eafd09A:
1028, 2000-01-21 13:24:59, 10001, AAA-001, 2000-01-21 13:24:59, 10002, 1234500110001, 000eafd099, 99, 2000-01-21 13:24:59, 10003, 1234500110001, 000eafd09A, 99,
<domain-data><transportation-company>XRX</transportation-company><container-id>5723</container-id></domain-data>

The above example is presented in multiple lines to facilitate reading, however, one skilled in the art will recognize that the data may be sent as an unbroken stream of characters.

A "modify association" event is processed differently. If both the tag and asset in the association event are new, then the modify association event is processed as an append association event. If both tag and asset are already in the database, then the tag and asset are unassociated and a new association is established. If the asset is already present in database but the tag is new, then the modify association event is processed as an append association event. If the tag is already in database but the asset is new, then the event is processed in two steps, the existing tag association is deleted and then the new asset is associated with the tag.

For example, consider an existing association in the database:

| Record | Asset | Tag | Location |
|---|---|---|---|
| 1 | 10011 | T100 | Fresno |
| 2 | 10011 | T102 | Fresno |
| 3 | 10012 | T101 | Fairfield |
| 4 | 10012 | T103 | Fairfield |

In this instance, there are four associations, two showing an asset at Fresno, two showing an asset at Fairfield. Two tags are associated with each asset. At a subsequent data point, a read event for as set 10011 shows tags T100 and T101 and a read event for as set 10012 shows tags T102 and T103. Therefore, the above existing records 2 and 3 that are in the database are incorrect. The database information is therefore corrected using the modify association event as follows:

| Record | Mode | Asset | Tag | Resultant action |
|---|---|---|---|---|
| 2 | M | 10011 | T101 | Remove association of T101 and Asset 10012, create association of T101 and Asset 10011 |
| 3 | M | 10012 | T102 | Remove association of T102 and Asset 10011, create association of T102 and Asset 10012 |

The inventory history at both Fresno and Fairfield may also be incorrect due to the incorrect associations, therefore, the inventories should be updated to reflect the corrected association information.

The "delete association" event is used when assets reach their destination and tags are removed. It is then necessary to delete the tag and asset associations that exist in the database. If the delete event targets non-existing associations, the event is ignored and an error is logged. For example, consider the original database records 1 through 4 shown above. If an attempt were made to delete all four records, it would yield the following results:

| Record | Mode | Asset | Tag | Resultant action |
|---|---|---|---|---|
| 1 | D | 10011 | T100 | Remove association of T100 and Asset 10011 |
| 2 | D | 10011 | T101 | Ignore (log error) |
| 3 | D | 10012 | T102 | Ignore (log error) |
| 4 | D | 10012 | T103 | Remove association of T103 and Asset 10012 |

The delete association between Asset 10011 and T101 failed because the target association did not exist in the system. Likewise with Asset 10012 and T102. In both cases, errors are logged into the system.

Aggregation

Figure 4:
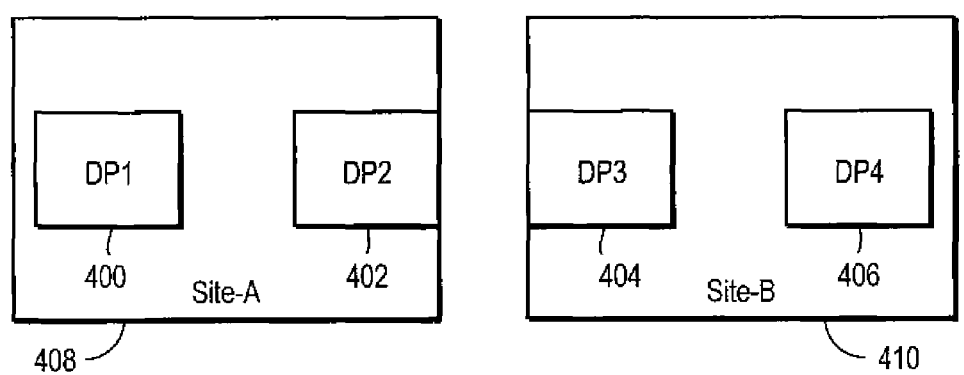
FIG. 4 is a block diagram illustrating two sites, each having two Data Points, in accordance with a specific embodiment of the present invention.

Referring now to FIG. 4, in order to properly track assets stored in containers or other conveyances, the present invention utilizes aggregation and de-aggregation techniques. A data point may be configured as an aggregation or de-aggregation point. When an asset is loaded into a conveyance and read at an aggregation data point, the system generates aggregation records showing that the asset is aggregated into the conveyance. When an asset is removed from a conveyance at a de-aggregation point, the system de-aggregates the asset from the conveyance. Configuration of a data point to handle aggregation activity requires also that both the Site Server and the Data Center serving that data point be configured to interpret and store the aggregation or de-aggregation data.

An event from an aggregation data point normally contains a container ID and one or more tag reads. If there is no container ID present in the aggregation event a virtual ID is created to represent the container id. The set of tag reads are aggregated with this container ID. An event from a de-aggregation data point contains container ID and one or more tag reads. If container ID is present in the event then the assets in this container are extracted from the de-aggregation event, and their asset activity and de-aggregation is published. If the container ID is missing in the de-aggregation event but an asset ID of the container exists in database, then asset activity and de-aggregation is published.

Illustrated in FIG. 4 is a block diagram of two sites 408 and 410, each having two data points. At site 408, DP1 400 is configured for aggregation activity, whereas DP2 402 is configured for shipment activity. At site 410, DP3 404 is configured for receive activity, and DP4 406 is configured for de-aggregation activity.

In actual operation, assets are assembled and loaded into a conveyance and aggregated at DP1 400 and the group then travels to DP2 402 where it is shipped. At DP3 404 the aggregated group of assets is received and then moved to DP4 406, where the shipment is disassembled and group is de-aggregated.

In a specific embodiment of the present invention, the aggregation event is formatted as follows:

event=data-point-id, time-stamp, sequence-no, data-spec, domain-data-spec
where:

```
data-point-id = number
data-spec = container-read-count, tag-read(s)
    container-read-count = integer
    tag-read = time-stamp, sequence-no, reader-id, tag-id, tag-type
domain-data-spec = XML character string
```

Container-read-count indicates how many reads come from the tag or tags attached to the container itself. Tag reads comprise container tag reads followed by container content tag reads. If container-read-count is non-zero, then container-read-count quantity of subsequent tag reads are from the container tags, which will be followed by tag reads of the assets. If container-read-count is zero, then all subsequent tag reads for this event are asset reads.

In accordance with the preferred embodiment, a container asset with tag eafdx66 has been loaded at DP1 400 with an asset with tag eafd099 and an asset with tag eafd09A. DP1 400 is configured for aggregation activity and the Site Server at this site uploads an aggregation event for describing the above aggregation. The ID of DP1 400 is 1028, reader id at DP1 is 12345, ID of DP2 is 1029, the tag-type is 99 and the existing sequence count is 10000.

The aggregation event recorded from site 408 will be:
1028,2000-01-21 13:24:59,10001,1,
2000-01-21 13:24:59,10002,12345,eafdx66,99,
2000-01-21 13:24:59,10003,12345,eafd099,99,
2000-01-21 13:24:59,10004,12345,eafd09A,99,
<domain-data><transportation-company>DHL</transportation-company><container-id>123</container-id></domain-data>

The above example is presented in multiple lines to facilitate reading, however, one skilled in the art will recognize that the data may be sent as an unbroken stream of characters.

The assets travel to DP2 and are subsequently shipped. At DP3 the assets are received and travel to DP4 where they are de-aggregated. The ID of DP3 is 2000, the ID of DP4 is 2001, the reader id at DP4 is 6345 and that the sequence number is 7000. Referring back to the data format discussed earlier, the de-aggregation events from site 410 will be:
2001,2000-01-21 23:24:59,7001,1,
2000-01-21 23:24:59,7002,6345,eafdx66,99,
2000-01-21 23 :24:59,7003,6345,eafd099,99,
2000-01-21 13 :24:59,7004,6345,eafd09A,99,
<domain-data><transportation-company>DHL</transportation-company>
<container-id>123</container-id></domain-data>

The above example is presented in multiple lines to facilitate reading, however, one skilled in the art will recognize that the data may be sent as an unbroken stream of characters.

The system may alternately be configured for partial de-aggregation, where tag reads for fewer assets than the total held by the container is to be interpreted as removal of only those assets, or complete de-aggregation, where tag reads for fewer assets than the total held by the container results in the system recording that all the assets held in the container have been removed. The latter is also termed de-aggregation by inference.

For example, assume a pallet initially has ten tagged totes, each containing fifty items. At some point in its movement, the pallet passes through a de-aggregation data point and the DA at the data point reads three tags unloaded. The resultant information in the system will depend on how the system is configured. If the data point is configured as a partial de-aggregation data point, the system will record that three out of the ten totes were removed and the rest remain on the pallet. If the data point is configured for complete de-aggregation, the system records that all ten totes were removed, leaving none remaining on the pallet.

Additionally, at an aggregation data point, it may be specified that the Data Center should perform aggregation by inference, where reading less than the total number of tags, or reading the container tag alone, is recorded as a complete aggregation, that is, the container contains its full complement of goods. Similar logic is executed at a point configured for de-aggregation by inference.

For example, at an aggregation by inference data point at a General Motors facility, detection of an asset of the General Motors door rack type will indicate to the Data Center that the rack contains 12 doors. On another line, identifying the rack at a de-aggregation by inference data point will indicate to the Data Center that all the 12 doors have been removed from the rack.

Compensation

Compensation is the process through which the system deals with incorrect or inadequate data such as caused by missed tag reads or temporary equipment failure. This allows the system to function smoothly despite minor errors. If the reads from the DA and the uploads from the SS were 100% accurate, there would be no need for compensation logic because there would be no loss or incorrect transaction data. However, in the real world, compensation logic is needed to recover from missed reads and missed data uploads from the DA. Compensation logic is designed to compensate asset, or asset group, movement activity whenever there are missed tag reads. Compensation may be for aggregation information, movement information. based on zone hierarchy, that is the physical location of the data points, or a combination of these. In order to determine compensation type, the system analyzes asset movement activity based on previous known reads and activities as well as current reads and activities.

Aggregation Compensation

Figure 5:
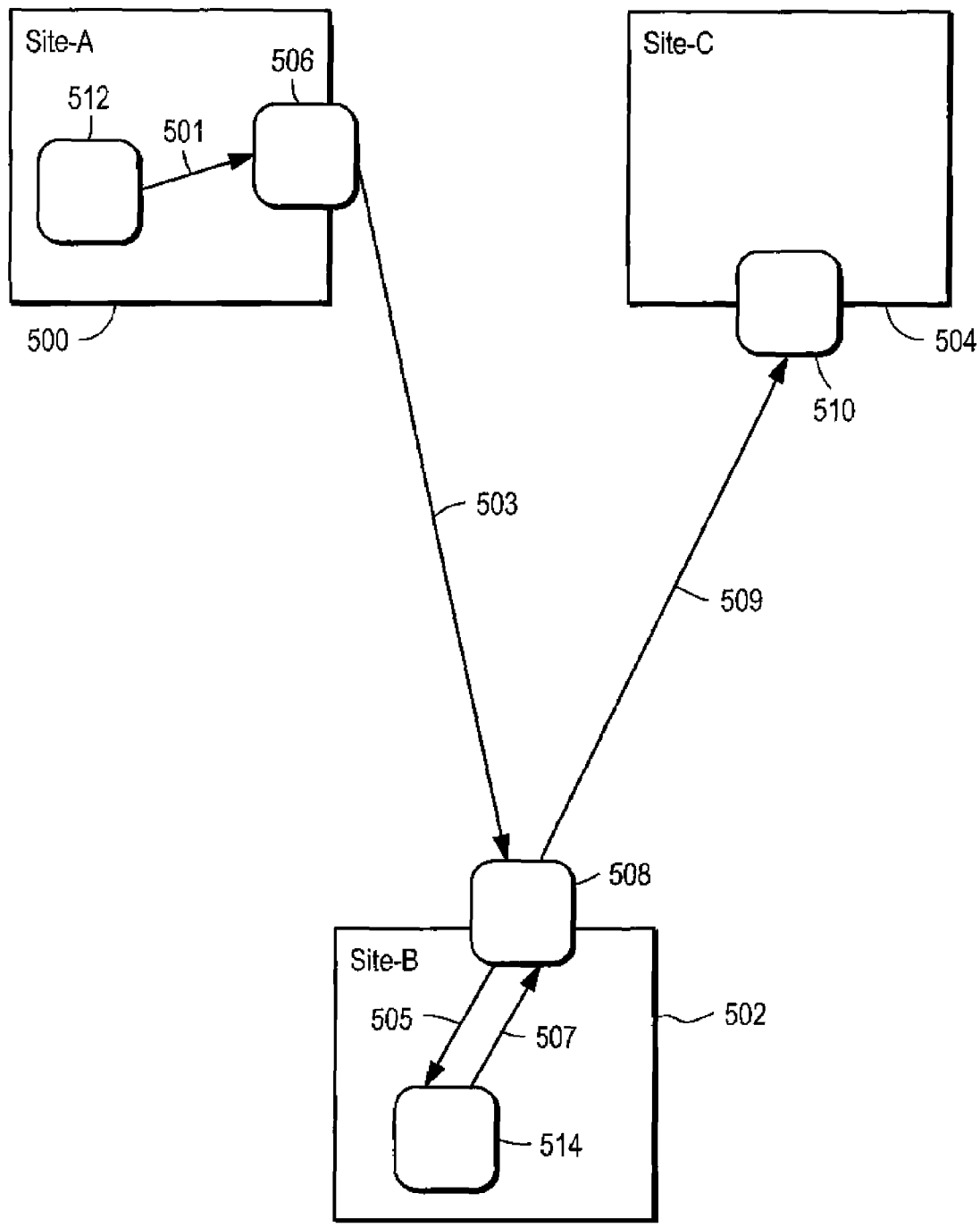
FIG. 5 is a block diagram illustrating a system where compensation logic may be used in accordance with a specific embodiment of the present invention.

Referring now to FIG. 5, there is illustrated a block diagram of a system where compensation based on aggregation logic may be used. Illustrated in FIG. 5 are 3 sites A 500, B 502 and C 504, each having a dock 506, 508 and 510 respectively to generate ship and receive activity. In addition to docks, the system has data point 512 at site A 500 configured for aggregation, and data point 514 at site B 504 configured for de-aggregation.

The assets travel from aggregation point 512 to dock 506 as route 501, from dock 506 to dock 508 as route 503, from dock 508 to de-aggregation point 514 as route 505, from de-aggregation point 514 to dock 508 as route 507, and from dock 508 to dock 510 as route 509.

For example, Georgia Pacific loads assets Bin-007 and Bin-008 into Pallet-001 at aggregation point 512. Assets Bin-007 and Bin-008 are tagged, thus the system generates two load activities, one each for Bin-007 and Bin-008. They are then aggregated with Pallet-001 which is not tagged. Pallet-001 then travels with its cargo on route 501. The reader at dock 506 picks up tags on asset Bin-007 and Bin-008. The system generates ship activities for Bin-007, Bin-008 and Pallet-001 since Pallet-001 is grouped with Bin-007 and Bin-008 through aggregation. Pallet-001 activity has been compensated through aggregation.

Pallet-001 then travels on route 503. The reader at Dock 508 of site B 502 picks up the tag on asset Bin-007, however, the tag on Bin-008 is not read. Since Bin-007 has been aggregated with Pallet-001 and Bin-008 through aggregation at data point 512, the system compensates for the missed read of Bin-008 and generates three receive activities, for Bin-007, Bin-008 and Pallet-001. Thus, Bin-008 and Pallet-001 activities are compensated through the aggregation information.

Pallet-001 then travels on route 505. At de-aggregation point 514, Georgia Pacific unloads asset Bin-007 and Bin-008 from Pallet-001. The system will generate de-aggregation activities for each of Bin-007 and Bin-008 with Pallet-001.

Asset Bin-007 is then moved separately on route 507. The reader at dock 508 picks up the tag on asset Bin-007. The system will generate one ship activity for Bin-007 but not Pallet-001 or Bin-008 because the asset group information from de-aggregation point 514 indicates that Bin-007 has been de-aggregated from Pallet-001 and Bin-008 and is now travelling alone.

Zone Hierarchy Compensation

Zone hierarchy refers to a tree-like data structure that defines the relationship between data points in a particular area. Generally stated, on any given branch of the tree structure, data points that are farther from the root are said to be nested within the data point next closest to the root on the same branch.

Compensation based on zone hierarchy uses asset movement logic and provides for missed read situations. For example, an asset leaves a particular data point X, however, the reader at a subsequent data point Y fails to read the asset tag. At a further data point Z the asset tag is detected. In this case, the system compensates the data point Y where the asset was missed, since it could not have arrived at data point Z without having moved through data point Y.

Figure 6:
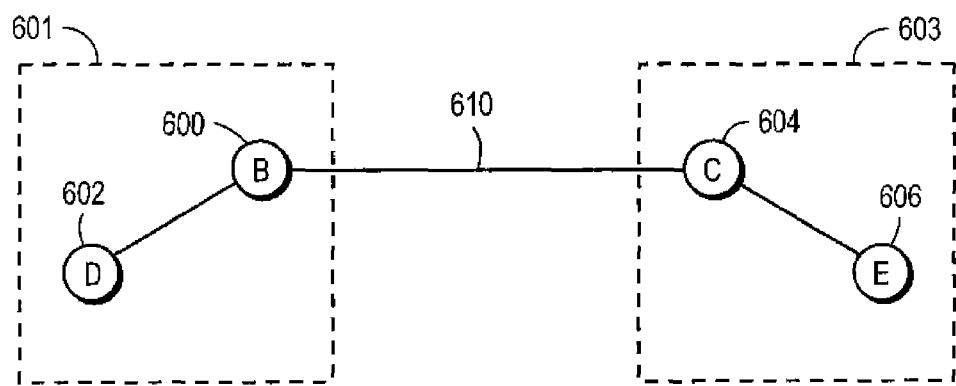
FIG. 6 is a diagram illustrating an example of compensation logic based on zone hierarchy in accordance with a specific embodiment of the present invention.

FIG. 6 is a diagram illustrating an example of asset movement compensation based on zone hierarchy. In the example, zones B 600 and D 602 are located in warehouse 601, zone B 600 at a ship location and zone D 602 at a storage location. Zones C 604 and E 606 are located in another warehouse 603, zone C 604 at a receive location and zone E 606 at a storage location. According then to the present embodiment, zone B 600 has nested zone D 602 and zone C 604 has nested zone E 606. A movement path 610 is provided as the path between the four zones.

If asset Carton AA is located at zone D 602, that implies it is within zone B 600 because of the nested zone relationship. If Carton AA is shipped from zone D 602, the tag read event at zone D 602 will generate a ship event for Carton AA which will be recorded at the Data Center. Carton AA moves on path 610 towards zone C 604, however, the reader at zone B 600 does not sense the tag. Accordingly, the system assumes that the Carton AA is still within zone B 600 and that the inventory of zone B 600 includes Carton AA. At a subsequent time, Carton AA is detected at zone C 604. The zone hierarchy compensation logic automatically corrects for the missed read by traversing the tree and generating a ship event for Carton AA from zone B 600 to correct the inventory at zone B 600. This is possible because of the zone hierarchy: Carton AA cannot have left zone D 602 and arrived at zone C 604 without having passed through zone B 600.

Alternately from the above example, Carton AA is shipped from zone D 602, however, the tag read at zone D 602 does reach the Data Center due to communication failure. Thus, the system still records that Carton AA is at zone D 602. Carton AA moves on path 610 towards zone C 604 and the reader at zone B 600 senses the tag and creates a ship event for zone B 600. The system uses zone hierarchy compensation to automatically create a ship event for zone D 602 otherwise the inventory at zone D 602 will be incorrect. At a later time, Carton AA is detected at zone C 604. Zone hierarchy compensation logic automatically traverses the tree to verify the ship events for zone B 600 and zone D 602 since, according to the zone hierarchy, Carton AA cannot have arrived at zone C 604 without having passed through zone B 600 after having left zone D 602.

Compensation Based on Zone Hierarchy and Aggregation

Figure 7:
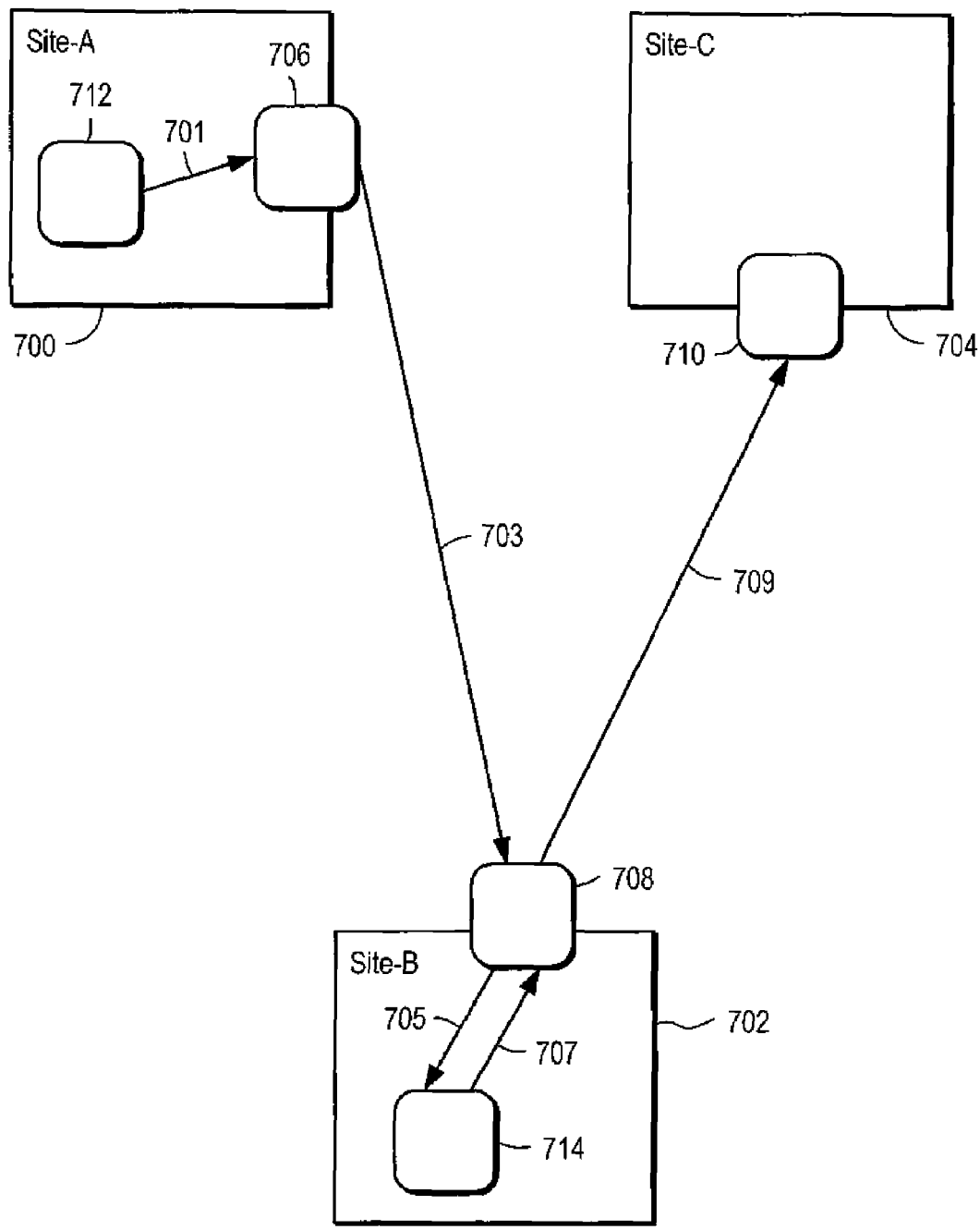
FIG. 7 is a diagram illustrating an example of compensation based on aggregation.

FIG. 7 is a diagram illustrating an example of compensation based on zone hierarchy and aggregation. There are shown three sites A 700, B 702 and C 704 having docks 706, 708 and 710 respectively to generate ship and receive activity. In addition to docks, the system is configured with an aggregation point 712 at site A 700 and a de-aggregation point 714 at site B 702.

The assets travel from aggregation point 712 to dock 706 as route 701, from dock 706 to dock 708 as route 703, from dock 708 to de-aggregation point 714 as route 705, from de-aggregation point 714 to dock 708 as route 707, and from dock 708 to dock 710 as route 709.

For example, assets Bin-007 and Bin-008 are loaded onto Pallet-001 at aggregation point 712. Assets Bin-007 and Bin-008 are tagged, thus the system will generate two load activities, one each for Bin-007 and Bin-008, and aggregate them with Pallet-001 which is not tagged. Pallet-001 then travels with its cargo on route 701, however, the reader at dock 706 did not detect any of the aggregated group's tags. Subsequently, on arrival at dock 708 of site 702, at least one of the set of tags are read for the aggregated group. The system will then compensate dock 708 for the aggregation as well as generate a ship event for dock 706 where the aggregated group had been missed.

Examining the situation in detail, Pallet-001 was loaded with Bin-007 and Bin-008 at aggregation point 712 in site A 700 and is traveling on route 701. The reader at dock 706 does not pick up any tags when assets Bin-007 and Bin-008 arrive, thus no activity is generated. The group leaves site A 700 on route 703 and subsequently arrives at site B 702. The reader at dock 708 of site B 702 picks up the tag on asset Bin-007 but not Bin-008. Since Pallet-001 and Bin-008 were grouped with Bin-007 at aggregation point 712, the system will generate three receive activities at site B 702, for Bin-007, Bin-008 and Pallet-001. Thus, Pallet-001 and Bin-007 activities are compensated at site B 702 through compensation on aggregation information. In addition, the system will generate ship activities at site A 700 for the three items, Bin-007, Bin-008, and Pallet-001 through the compensation of zone hierarchy.

Correction of Time Stamp

Compensation logic affects two items in the record of an asset's movement activity: physical location information and the time mark of the physical location. Since compensation logic generates substitute asset movement activity for missed tag reads, there are potential data inconsistencies that may result in incorrect time stamps for asset inventory and shipment and arrival reports. The more missed tag reads, the more compensated activity records will be generated and the more potential data-inconsistency problems will need to be addressed.

In the situation where compensation logic has created a substitute record event for a missed tag read, the system will have generated a substitute or assumed time stamp. If the read event data is recovered, the system will use the time stamp of the recovered tag read event to replace the compensated time stamp thereby correcting the asset location information. The deeper the level of zone being compensated with generated tag reads and time stamps, the more nesting rollback actions need to be performed.

Referring again to FIG. 7, asset Bin-007 was received at dock 708 of site 1B 702 at time t1 and the event record was uploaded to the Data Center to generate a receive activity for site B 702. At time t2, asset Bin-007 ships out of dock 708, however, the record of the event was not uploaded to the Data Center due to a communication problem. If the user subsequently views the inventory report of site B 702, the system will show asset Bin-007 located at site B 702. At time t3, asset Bin-007 arrives at dock site 710 of site C 704 and the event record is uploaded to the Data Center. Through zone hierarchy compensation, the system knows that the asset must have left site B 702, therefore, the system generates a compensated ship activity for Bin-007 from dock 708 of site B 702 with a shipment time stamp, tx, calculated to be between times t1 and t3.

If the user were to view the inventory report of site B 702 at time t3, the system will show asset Bin-007 as having left dock 708 at computed time tx. At time t4, the communication problem is addressed and the real tag read event time t2 for the shipment of asset Bin-007 from dock 708 is uploaded to the Data Center. For this particular tag read, the Data Center will not log a normal tag read event since its records indicate that the corresponding tag read has been generated through compensation logic and real time has already passed the compensated time tx. Accordingly, the system will adjust the time stamp of the ship activity, tx, to the correct time t2 which is identified in the late arriving read event.

Examining another example of correcting time stamps of movement activity based on compensation, Georgia Pacific loads asset Bin-007 and Bin-008 into Pallet-001 at aggregation point 712 of site A 700 at time t0. The group then travels to dock 706. The reader at dock 706 of Zone A 700 picks up tags on asset Bin-007 and Bin-008. The system then generates ship activities at time t1 for Bin-007, Bin-008 and Pallet-001 since Pallet-001 was grouped with Bin-007 and Bin-008 at time t0. Pallet-001 activity is compensated through aggregation information.

Pallet-001 then travels into site B 702 at time t2. The reader at dock 708 picks up the tag on asset Bin-007 but not Bin-008. This tag read event record is uploaded to the Data Center and processed. Since Pallet-001 and Bin-008 are grouped with Bin-007, the system will generate receive activities at time t2 for Bin-007, Bin-008 and Pallet-001. Pallet-001 and Bin-008 activities are thus compensated through aggregation information.

Pallet-001 then travels to de-aggregation point 714 of site B 702 at time t3. Georgia Pacific unloads assets Bin-007 and Bin-008 from Pallet-001 at de-aggregation point 714, however, the de-aggregation event does not get uploaded to the Data Center due to a communication problem. Since activity event at site B 702 was not received by the DC, the system will not record the unload activities for Bin-007 and Bin-008 with Pallet-001 and thus the database still indicates that asset Bin-007 and Bin-008 are aggregated with Pallet-001.

Bin-007 is then sent separately out of site B 702 at time t4. The reader at dock 708 of site B 702 picks up the tag for asset Bin-007. This tag read event record is uploaded to the Data Center and processed. By the rule of compensation based on aggregation, the system will generate a ship activity at time t4 for Bin-007 and will also generate ship activity for Bin-008 and Pallet-001 since they are still recorded as being grouped with Bin-007. Bin-007 continues on to site C 704. At time t5 the tag for Bin-007 is read at site C 704 and the system records the receive event for Bin-007, however, since the compensation based on aggregation is still in effect, the system also records receive events for Bin-008 and Pallet 001 at time t5.

At time t6, the communication problem from site 700 to the Data Center is resolved and the de-aggregation event from time t3 are uploaded to the Data Center. Since this event shows that there was a de-aggregation activity at site B 702 at time t3, the system corrects the movement records by removing the compensated ship activity recorded at time t4 for Pallet-001 and Bin-008 at site B 702 and removing the compensated receive activity recorded at time t5 for Pallet-001 and Bin-008 at site C 704. In this manner, the system maintains an accurate picture of asset location and movement activity.

Enterprise Account Manager

The Enterprise Account Manager (EAM) provides the security, authentication and access control functions for all the users in the network. All the supply chain activities information is important to users and therefore not to be disclosed to unauthorized third parties. Thus it is necessary to ensure that each user can view only their own information and their supply chain partners' information that was granted viewable to them.

Additionally, within each user's organization, the access and/or view of different sets of information may also need to be controlled. For example, an organization may want an employee in the shipping department to be able to view shipping-reports, but not the inventory-summary. These organization specific controlling requirements may be known by the administrator of the organization. In order to aid each of the users in tailoring their own access control requirements, the EAM may be used.

Most of the supply chain activities involve more than one party. For example, shipping of a particular merchandise might involve more than one vendor, receiver, packaging vendor, shipper and possibly warehouse distributor. All of these parties may need to view not only the shipping data that are common to everyone, but also some of the inventory information that might belong to a private party. Additionally, in a particular supply chain, the vendor of down-stream merchandise is sensitive to the activities by the vendor of up-stream merchandise, even though there is no direct business transaction or goods transportation between them.

The EAM provides tools for the administrators of the supply chain users to configure the access control within their own organization. The EAM also provides tools to define supply chain partners for a user, as well as tools for system administrators of users to grant access to resources regarding their supply chain to partners. The EAM can divide the user authorized persons into groups. For example: Overall System administrator, Site Manager, Billing and Finance, Customer Support, End-user system administrator, and End-user general users.

For access control, the EAM uses Roles to help the site manager and end user system administrator manage the users, resources, and the control of access to the resources. Each user is designated an account. Under the account, there can be several Roles. A Role is a representation of a group of users having certain access right to certain resources. There might also be Folders under an Account, the Folder being a representation of a group of available resources. An end-user will be associated to one Role, and there will be always a Role associated to a user.

The available resources include reports, alerts and other information viewable to the end-users. Each of the Folders can represent a group of resources. A particular resource may be in more than one Folder. The use of Roles and Folders simplifies the management of the users and resources. In a company of 500 employees with 1000 resources, the matrix needed to manage individual access would be 500 by 1000. In accordance with the invention, 15 Roles may be created representing users with similar job functions and responsibilities and 30 Folders of similar resources may be created, thus the administration of the company will be handled by a 15 by 30 matrix, as opposed to the 500 by 1000 without the Role/Folder groupings.

Only the overall System Administrator and Site Manager can create, suspend and revoke an account. Only the overall System Administrator, Site Manager and customer System Administrator can view, create and modify the Roles or Folders. The overall system administrator and site manager will do the creation of Role and Folder in the initial installation stage. After the installation, most of the administration work will be performed by customer's System Administrator.

Figure 8:
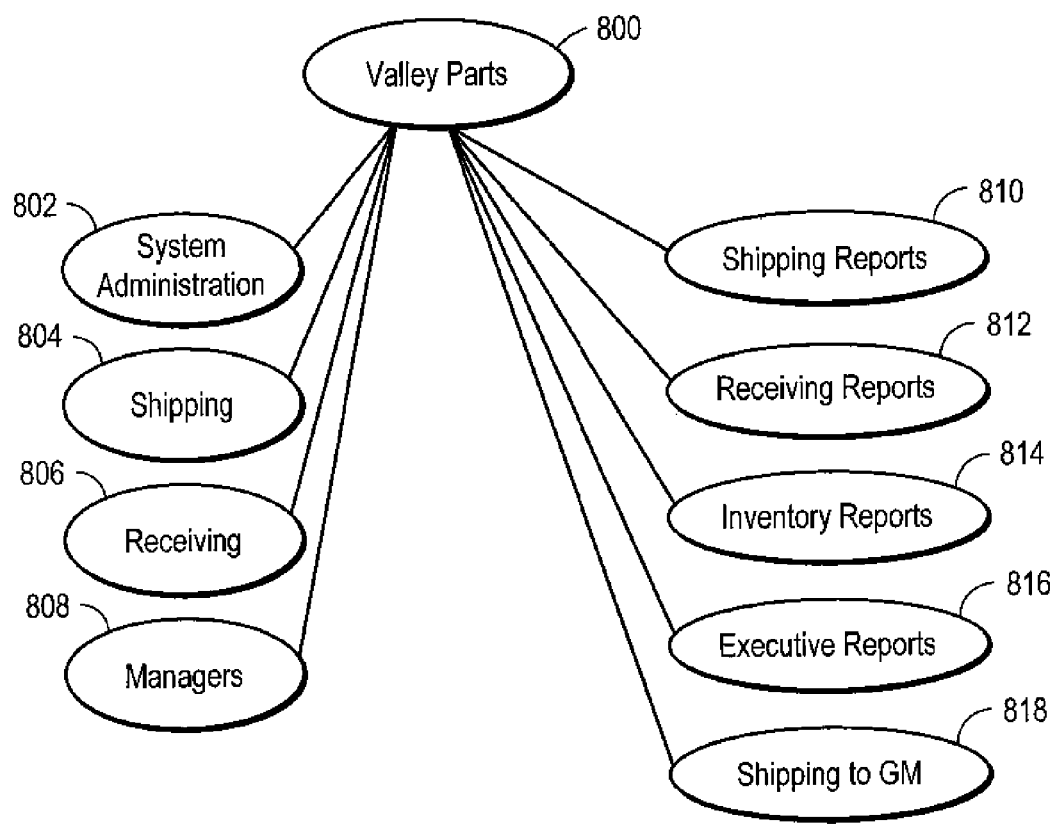
FIG. 8 is a diagram illustrating an example of roles and folders in accordance with a specific embodiment of the present invention.

FIG. 8 is a diagram illustrating an example of Roles and Folders in accordance with the present invention. The access control for a Folder is controlled by the EAM by linking the Folder access to a Role within the same account. For example, a customer named 'Valley Parts' 800 may have about 200 employees involved in the supply chain activities. There are four Roles: 'System Administration' 802, 'Shipping' 804, 'Receiving' 806, and 'Manager' 808. Under 'Valley Parts' 800, there are five Folders for viewable resources: 'Shipping Reports' 810, 'Receiving Reports' 812, 'Inventory Reports' 814, 'Executive Reports' 816 and 'Shipping to GM' 818. If 'Valley Parts' 800 decides to let a manager Role access all reports, a shipping Role access all shipping and inventory reports, a receiving Role access all receiving and inventory reports, and a system administrator access no reports, the access matrix will be as follows:

|  | Role | | | |
| --- | --- | --- | --- | --- |
|  | System Administrator | Shipping Role | Receiving Role | Manager |
| Shipping Report Folder |  | Y |  | Y |
| Receiving Report Folder |  |  | Y | Y |
| Inventory Report Folder |  | Y | Y | Y |
| Executive Reports Folder |  |  |  | Y |
| Valley Parts Shipping To GM Folder |  | Y |  | Y |

Using the EAM, the system administrator establishes the links among Roles and Folders for the access control configuration listed above. With the access control set by the EAM, users who belong to Receiving Role will be viewing only the reports (and possibly other resources) within the 'Receiving Report Folder' and 'Inventory Report Folder'. Unless the access is changed by their system administrator or the overall system administrator, they can not access other resources.

For resource sharing, the EAM allows users to share the information among its supply chain partners. The sharing mechanism is an extension of the access control described above. Before customers can share their data outside, they need to define their partners. A supply chain partner is another customer who has supply chain business with this customer. Customers need to inform the system of the identity of their supply chain partners. The customer may expose their folder to some of their supply chain partners. Once exposed, the folder will be viewable within the exposed supply chain partner's folder list. The exposed supply chain partner can then assign the access of this folder to some of its roles.

For example, 'Valley Parts' may have created a special folder 'Valley Parts Shipping To GM Folder' for their supply chain partner 'General Motors' and customized a special shipping report 'Shipping Report to GM' into the folder. Then 'Valley Parts' could expose the folder 'Valley Parts Shipping To GM Folder' to 'General Motors'.

Figure 9:
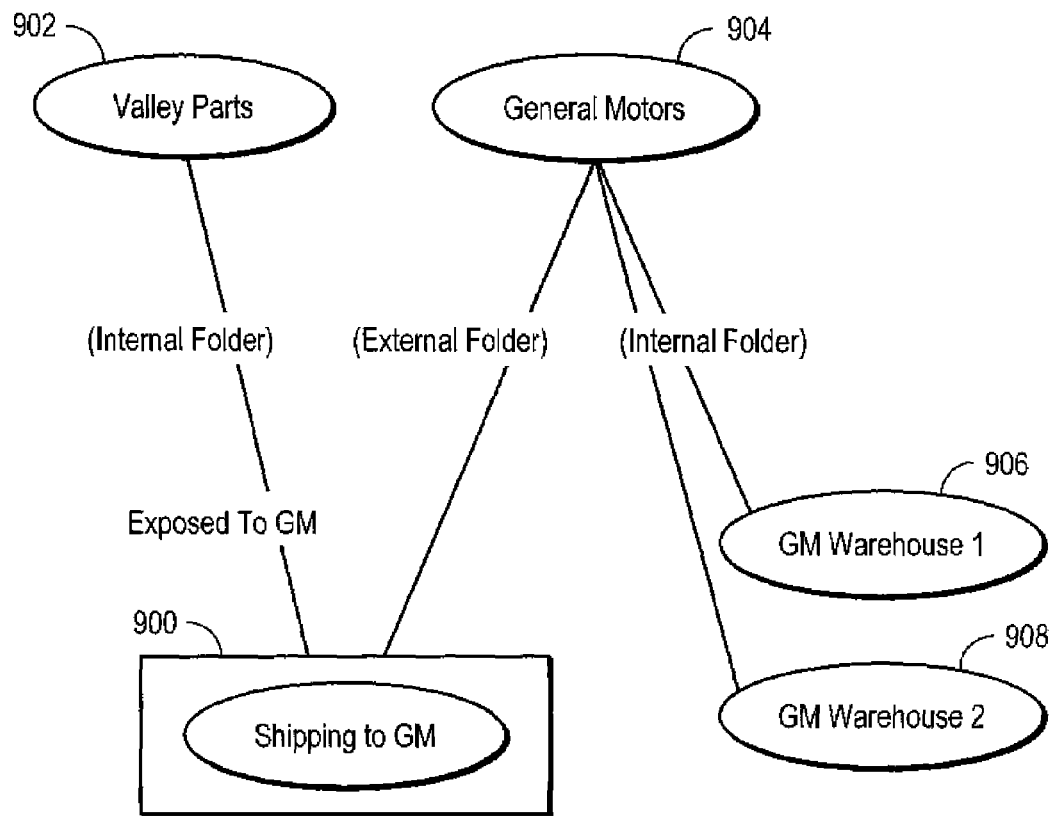
FIG. 9 is a diagram illustrating an example of resource sharing in accordance with a specific embodiment of the present invention.

After the exposure of the folder, the end-user System Administrator will notice that there will be an external folder 'Valley Parts Shipping To GM Folder' available in their folder list. The System Administrator can then assign the access of this folder to some of GM's roles. Employees of GM who belong to the roles then will be able to access the report 'Shipping Report to GM' within the folder. FIG. 9 is a diagram illustrating this example. As can be seen, the 'Shipping to GM' folder 900 is an 'Internal Folder' to Valley Parts 902. After the folder is exposed to General Motors 904, the folder will be an 'External Folder' to General Motors. The System Administrator of General Motors then can assign access to their roles the same as other (internal) folders such as 'GM Warehouse 1' 906 and 'GM Warehouse 2' 908.

For security, all users need to go through the user authentication in the EAM. Every user has a user-logon-id and a password. The user-logon-id is unique for each user. By providing the correct id and password, the user is able to access the resources. A user who might be suspended or inactivated either for billing or security reasons will not be able to access the system even if they provided the correct userid and password. Based on users' profiles and security access settings, the EAM will display the resources available to the users. The EAM also provides other facilities to enforce security such as access control updates to change password, create users and modify roles.

A customization manager extension to the EAM also enables the user to have more granular control of the access to resources. This extension can help achieve two goals: (a) helping the user personalize their reports, alerts, or any viewable resources; (b) helping users have better control over the exposing of reports, alerts or any viewable resource both internally and to its supply chain partner.

Filtration

In many cases the data collected by data collection hardware may contain duplicate or redundant data. The duplicate, redundant or otherwise incorrect information should be filtered out to provide the correct information necessary for asset visibility services.

There are two different types of filtering: tag filtering and asset filtering. Tag filtering is based on the Tag Rejection Time (TRT), defined as the time it takes for an asset moving with finite velocity to pass through a spherical RF field. If two reads of the same tag happen within the TRT, then one of them is a duplicate. Tag filtering can be applied at the Site Server level. The SS may apply tag filtration on a Data Appliance basis. When the SS receives two reads of same tag within the TRT it can treat one of the reads as duplicate and reject it. However, it cannot eliminate the duplicate in the case of two reads of the same tag within the TRT but from different Data Appliances. In this case tag filtering will be done at the Data Center level.

In some activities, two reads of the same asset may be received out of the TRT but still the system has to treat one of the reads as a duplicate. For example, if from an aggregation data point the system receives a set of tag reads from a multi tagged asset.

The Data Center receives events from all the Site Servers. The user specifies and configures at the Data Center level what activities happen at specific data points in the supply chain. The data received from the Site Server contains a collection of events for each data point. Each event received contains one or more tag reads. Filtering is applied per data point and depends on the activity configured at that data point. The association information, is used to convert tag read events to asset events. Asset filtering and tag filtering are applied on the resultant asset events.

For basic filtration, orphan tag read events are eliminated. If the tag is not associated to an asset then it is an orphan tag. Each tag read event is converted to asset event. Basic filtering is applied during processing events and before generating asset movement. The tag is extracted from the tag read event and the database queried for associated asset. If an event contains a tag which is not associated to an asset in database, then it is rejected.

When a collection of events is received from a data point that is configured for aggregation or de-aggregation, basic filtering followed by asset filtering is applied to remove duplicates from the collection of events. The collection of events received from a data point that is configured as ship/receive or wash includes set of single tag reads. Tag filtering is applied to remove duplicates. Tag filtering needs events that have happened in the past in order to decide whether or not the current event is a duplicate.

Automatic Installation Sequence

Automatic installation and registration of a Data Appliance is accomplished by each DA formatting a Description Document in the XML language and transferring that information to the Site Server using the UDAP protocol. The DA is completely characterized by its Description Document, which can be viewed with or without an SS. Configuration may be achieved through one of two scenarios. The DA may be pre-configured by the installer based on previous site surveys of the customer site. The required parameters may then be inserted into the Description Document. Alternately, the DA may be brought to the site for installation without being configured. The installer will then mount and connect the DA and configure it on-site according to the Description Document using a laptop computer.

For the preferred embodiment, the following is an exemplary sequence of a Device Appliance brought to online status:

1. The DA is installed and power is turned on. The DA sequences through its POST (Power On Self Test) and then sends a BOOTP communication to the SS to request an IP address.
2. After reception of an IP address, the DA sends a Notification Request using NDAP to notify the SS that it is online and ready to send its Description Document.
3. The SS acknowledges the Notification Request by sending the Discovery Request packets using DDAP.
4. The DA assembles the Description Document information and sends it to the SS.
5. The SS stores the Description Document, forwards it to the Data Center and then synchronizes the DA time clock using the SNTP protocol. After uploading, the SS terminates the Discovery Request packets.
6. The DA is now online and operational. Commands to the DA (e.g., status, read poll, set status indicators, select antenna, shut down, etc) are communicated using the CDATP protocol which also handles the acknowledgement.
7. Events that occur at the DA (e.g., tag reads, equipment failure, etc.) are communicated to the SS (and acknowledged) using EDATP protocol.

UDAP

The Universal Data Appliance Protocol (UDAP) is a suite comprised of six protocols, four of which are new in accordance with the present invention. Devices may use these protocols to exchange commands and data and to configure the devices. In the preferred embodiment, the complete suite of six are used. The protocols are summarized as follows:

| name | type | description |
|------|------|-------------|
| BOOTP | UDP | BOOTP, standard according to RFC951 and RFC952. May be used by the DA to request an IP address from the SS. The SS listens to BOOTP requests on UDP port 67 and the DA receives its IP address on UDP port 68. |
| NDAP | UDP | Notification Data Appliance Protocol, a UDP protocol new in this invention. The DA sends the NDAP Notification Request when it is ready to upload the Description Document. NDAP Notification Request packets are sent on port NDAP_PORT every NDAP_INTERVAL seconds until the SS uploads the Description Document. In the preferred embodiment, NDAP_PORT is 10000 and NDAP_INTERVAL is 10 seconds. |
| DDAP | UDP | Discovery Data Appliance Protocol, a UDP protocol new in this invention. The SS sends the DDAP Discovery Request packet to notify the DA of reception of the NDAP Notification Request. The DA responds with the DDAP Discovery Response packet on port DDAP_PORT at a random time within DDAP_INTERVAL seconds. In the preferred embodiment, DDAP_PORT is 10001 and DDAP_INTERVAL is 10 seconds. |
| CDATP | TCP | Control Data Appliance Transfer Protocol, a TCP protocol new in this invention. CDATP handles the transfer of the Description Document from the DA and other command and response communications. The Description Document contains the property and method elements for the DA, providing the information needed by the SS to monitor and control the DA. The DA uses port CDATP_PORT. In the preferred embodiment, CDATP_PORT is 10011. |
| EDATP | TCP | Event Data Appliance Transfer Protocol, a TCP protocol new in this invention. EDATP handles events and acknowledgments between the DC, the SS and the DA. The SS uses port EDATP_PORT. In the preferred embodiment, EDATP_PORT is 10010. |
| SNTP | UDP | Simple Network Time Protocol, standard according to RFC1769. Used to synchronize time between the SS and all DAs on the network. The SS and DA both use UDP port 123. |

Notification Data Appliance Protocol (NDAP)

NDAP is a UDP protocol that the Data Appliance initiates whenever it is reset (e.g., power on) or is assigned an IP address. The DA will repeat the NDAP Notification Request packet every NDAP_INTERVAL seconds. The DA terminates NDAP Requests when the SS uploads the Description Document. If a DDAP Discovery Request is received while Notification Requests are being sent, then the Notification packets are suspended for DDAP_INTERVAL * DDAP_TRIES seconds. In the preferred embodiment, DDAP_TRIES is 3 and DDAP_INTERVAL is 10 seconds.

Notification Request message format
NDAPRequest (NDAP_PORT value)<crlf>
where:
NDAP_PORT is the SS UDP port that receives Discovery responses and Notifications. In the preferred embodiment, NDAP_PORT is 10000.

Discovery Device Appliance Protocol (DDAP)

DDAP is a UDP protocol that the Site Server initiates to identify all DAs on the network and ready them for transmission of the Description Document. The Discovery Request packet may specify:
All DAs
DAs with a specified Friendly Name
A DA with a specified Universal Device Name The Universal Device Name (UDN) is a permanent unique identity assigned at manufacture to each DA. The Friendly Name may be assigned by the installing technician and is designed for easy recognition by system users. If both the Friendly Name and the UTDN are missing in the packet, then all DAs will respond. Discovery Packets are sent whenever the SS is reset, the SS IP address changes, or there is loss of communication with a DA, for example when a the DA IP address is changed or a DA fails check status monitoring. The discovery request or response will occur DDAP_TRIES times. In the preferred embodiment, DDAP_TRIES is 3.

If either of the friendly name or UDN are present, then those DAs that match the identification will respond to the request. This will typically be performed in response to a Notification or on behalf of a remote site manager.

The DDAP Discovery Request Packet Contains:
SS IP as source address
broadcast IP destination address
Destination UDP port of DDAP_PORT The SS sends the DDAP Discovery Request packet to notify the DA that it is ready to establish the connection for CDATP. The DA responds with a DDAP Discovery Response packet at a random time selected from time interval DDAP_INTERVAL.

Discovery Request Message Format:
DDAPRequest (DDAP_INTERVAL value) (NDAP_PORT value) (EDATP_PORT value)<crlf>
(friendly name) (UDN value)<crlf>

Discovery Response Message Format:
DDAPResponse (CDATP_PORTvalue)<crlf>
(friendly name) | EMPTY (UDN value)<crlf>

The Discovery Response Contains:
CDATP_PORT, the TCP port that will be used to upload the description page
friendly name of the DA or the keyword EMPTY
The Universal Device Name (UDN)

Control Data Appliance Transfer Protocol (CDATP)

CDATP is a TCP protocol used to send commands, including the command to upload the Description Document. A Device Appliance listens on CDATP_PORT for a connection from a SS. The SS sends commands over this socket connection which are then executed by the DA. For each command, the DA will complete processing and return a response to the SS before accepting another command. This is a TCP connection and thus the SS can issue any number of commands without necessity to re-establish the connection. The SS should shutdown the connection as soon as it is done with the immediate task and should be prepared for the socket connection to be broken at any time. A connection may be broken because of a DA reset, a faulty hub or power fluctuations. The same socket connection should not be used over long period of times, each should be on the order of a second.

A command is comprised of ASCII characters terminated with a carriage return/line-feed.

Command Format:
(command)<crlf>

An example command is the word description. The Description command returns the Description Document in XML format.

Event Data Appliance Transfer Protocol (EDATP)

EDATP is a TCP protocol that a Data Appliance uses to transfer event data. The Site Server (SS) listens on port EDATP_PORT for a connection from a Data Appliance (DA). The DA can transfer from 1 to 127 events to the SS and wait for a response. This can be repeated until the DA has no more events to send. The DA should then shutdown or close the connection. This will free SS resources for use with other DAs. The Data Appliance should not hold the socket connection for more than it takes to upload the currently buffered events.

Each event is an ASCII text line terminated by a <crlf>.

| field | range | length | description |
|---|---|---|---|
| sequence number | 00–FF | 2 | Unique sequence number as hex-ASCII |
| flag | 00–FF | 2 | flag as hex-ASCII. See below. |
| day of year | 001–365 | 3 | Julian day of year as decimal number |
| second of day | 00001–86400 | 5 | second of day as decimal number |
| reserved | ---- | 4 | Reserved as 4 dashes. |
| event object | ASCII | nn | Source of event where nn is the length of the element reference. |
| space | 0x20 | 1 | A space separates the event element from any event text that follows. |
| event detail | ASCII | mm | Any descriptive text associated with this event. mm can range from 0 to megabytes. |
| line end | 0x0d0a | 2 | event line end |

Each event upload will consist of 1 to 127 event lines terminated by a <crlf>. A null line (a line with only <crlf>) terminates the event uploads. When the Site Server receives the null line, it will send the event response to the DA with the number of events received (which includes any events that the SS discarded via duplicate rejection). Multiple event uploads can occur on the same socket connection. However, in each upload no more than 127 events are to be uploaded before the DA receives a response from the SS.

```
Event response message format:
(number of events received) <crlf>
<crlf>
An example event exchange:
(DA):
1A0012386399----rfid.collect.event tagID = 21368 data = "four"
antenna[2].RSSI = 123<crlf>
(DA):
1B0012386399----rfid.antenna.event antenna[1] = FAIL<crlf>
(DA):
<crlf>
(SS):
2<crlf><crlf>
```

Sequence Number

The Site Server will compare the sequence numbers in the current upload with the sequence numbers in the previous upload. Events from the current load that match in sequence number the previous load will be discarded. For example, the DA uploads 7 events with sequence numbers 0xA0 through 0xA6 and does not receive a response within the allowed timeout period. The DA buffers 3 more events before the upload is retried, in the second case with all 10 events with sequence numbers 0xA0 through 0xA9. The duplicated events are detected using the sequence number and thus the Site Server discards the first 7 (0xA0 through 0xA6) events from the second upload.

Flag

The Flag Field Indicates Special Circumstances:

| name | code | description |
|---|---|---|
| BREAK | 0x01 | previous event not sent |
| SUPER | 0x02 | supervisory event |
| TEST | 0x04 | DA.control = TESTMODE |
| flag | nnnn | further uses |

The BREAK flag indicates that the sequence number of the current event and the previous event were not consecutive.

The SUPER flag indicates that this event indicates a failure that requires service.

The TEST flag indicates that the event was generated while the DA was in test mode.

Further flags may be added to indicate special behavior required by the event, for example, to indicate that an XML document follows the event code. This may be needed when a DA delivers a complex document such as a shipping bill to the Site Server and it may be necessary to store these large "events" as files. In this situation, a flag would serve to indicate a file management situation.

Time Stamp

The time stamp consists of the Julian day and the second of the day, thus uniquely defining the event. The event time stamp may not always be in sequence, for example after a time adjustment has been made to the DA.

Event Object

The event object is a character string that uniquely identifies the event source and event type.

Event Detail

The event detail will depend on the specific capability of the DA and the requirements for processing events in the Business Logic and Data Center.

Cost Model

The system may be provided with a usage based pricing model linked to the source of value (the items being tracked). A fee per day per monitored conveyance may be applied. The fee may be charged regardless of whether the conveyance is stationary or moving, loaded with tracked items or empty. Included in this fee may be access to all data collected on the conveyance and the items in the conveyance. Additionally, a nominal fee may be charged for each site that is enabled for monitoring, such as a store, warehouse, or factory. Alternatively, each transaction may be charged individually.

SUPPLY CHAIN EXAMPLES

Example #1

Grocery Supply Chain

In this example the Commerce Visibility Network operates within the grocery industry to track perishable shipments from a supplier to a retailer via a distribution center, using reusable plastic containers. Participants in this embodiment include a supplier, such as a lettuce grower, beef processor, etc., a grocer, and a container leasing company. The items to be tracked include raw ingredients such as fruit, vegetables, and grains, and processed foods, such as packaged salads, canned soup, and packaged meat. Conveyances that hold the items include reusable plastic containers (totes), as well as cardboard containers, which hold the items and are loaded onto pallets.

Figure 10A:
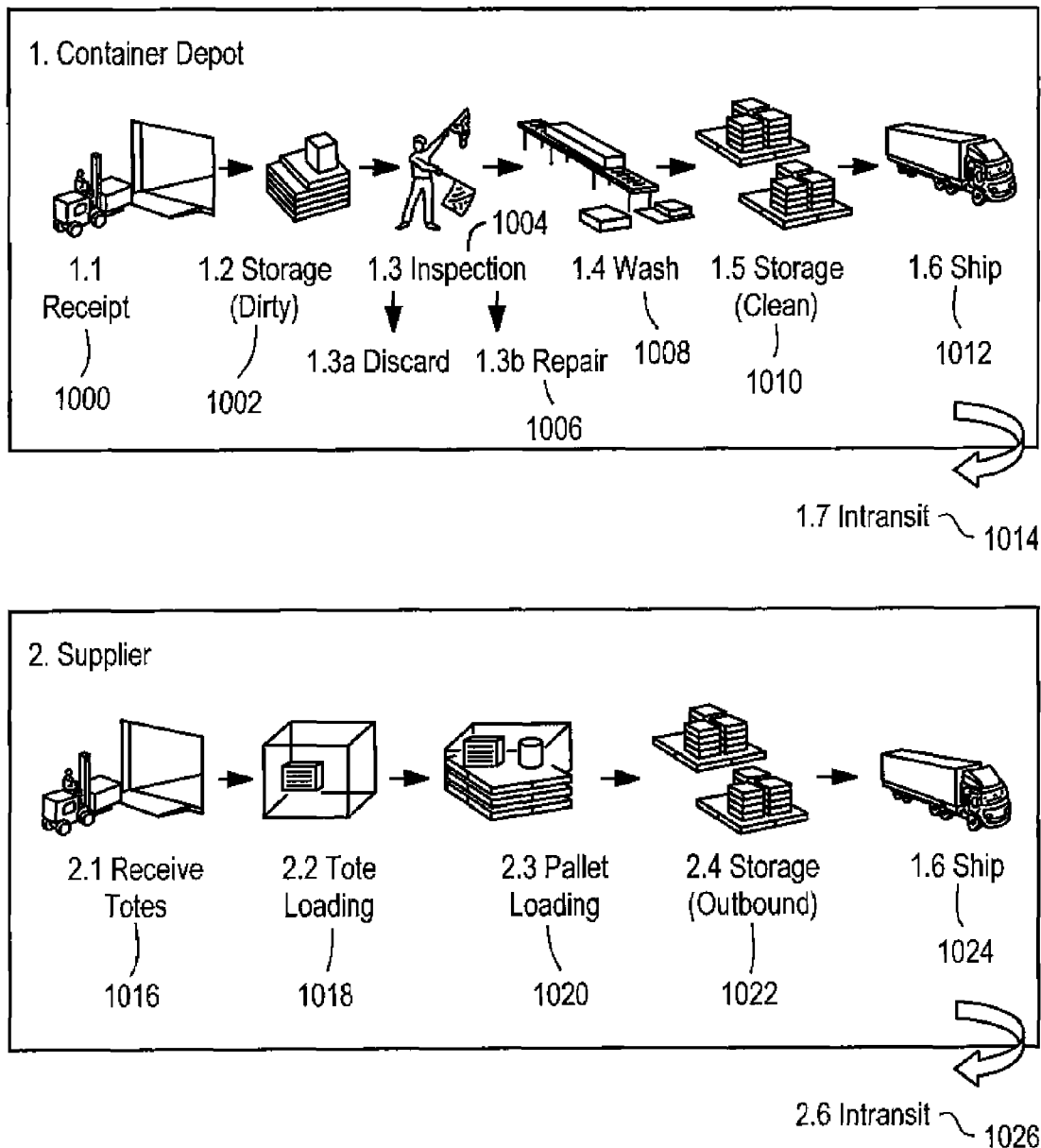
FIGS. 10A and 10B are diagrams illustrating a grocery supply chain in accordance with a specific embodiment of the present invention.
Figure 10B:
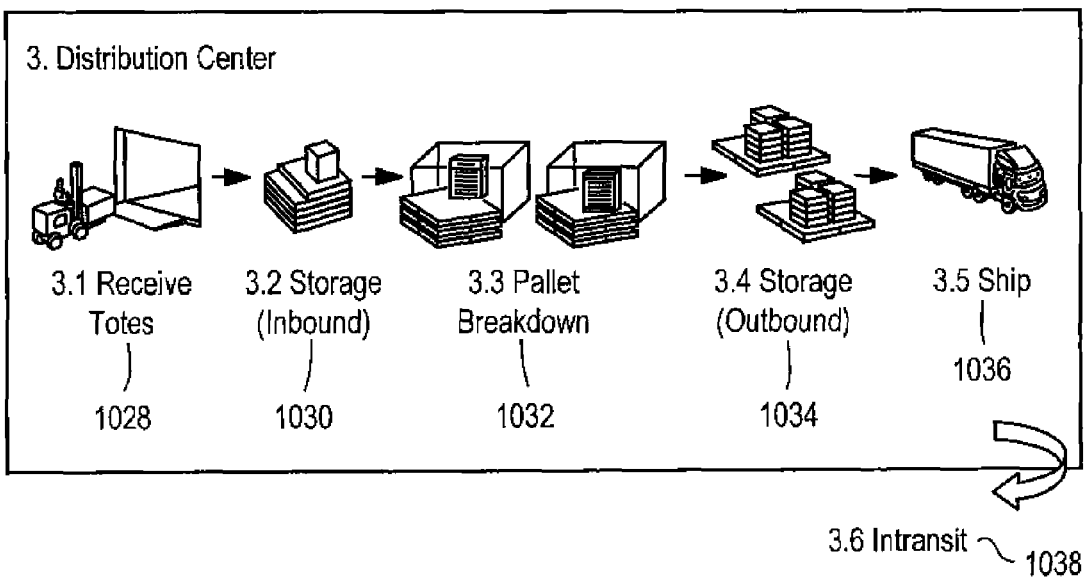
Figure 10B:
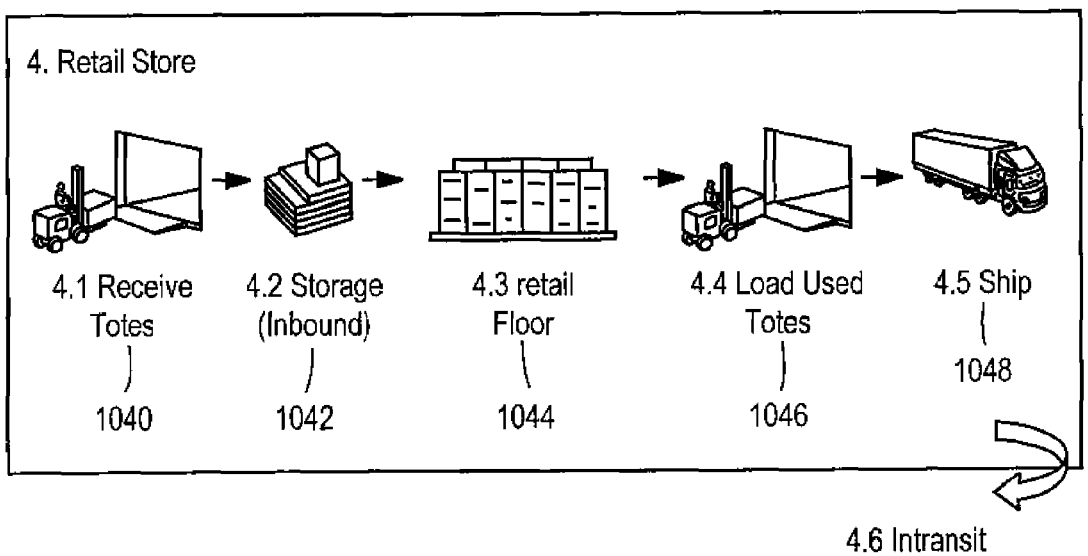

FIGS. 10A and 10B are diagrams illustrating a grocery supply chain in accordance with a specific embodiment of the present invention. Beginning with FIG. 10A, at 1000 dirty, collapsed totes are received through a dock door in the distribution center into the tote depot. The time/date of the tote arrival may be recorded and this information may be forwarded to the SS serving the distribution center. The totes are stored at 1002, and the SS may maintain an inventory of totes. If the number of totes gets too high, an alert may be generated to the depot manager. At 1004, totes are physically inspected for damage. The time/date of tote inspection is recorded, and severely damaged totes are disposed of. An alert may be generated here if there is a high percentage of damaged totes from a particular company (indicating perhaps that the company is mishandling the totes). At 1006, some totes may be repaired if damaged. The time/date of the repair is recorded, along with the description and cost of the repair.

At 1008, totes are washed by an automatic, high-temperature washing machine. The time/date of the washing may be recorded as well as the temperature/quality of the wash. At 1010, the clean totes are stacked on pallets and put into storage. If the inventory gets too high or too low, an alert message may be generated. At 1012, palletized totes will be associated with a customer order and shipped out through a dock door. The time/date of the tote shipment may be recorded as well as the destination of the tote. At 1014, the tote is intransit from the container depot to the supplier. GPS technology may be utilized to give the intransit location, inventory, and ETA (Estimated Time of Arrival) to the Data Center.

At 1016, pallets of clean totes are received at the supplier facility. They may be used immediately or stored for later use. The time/date of the tote arrival may be recorded and stored at the SS for the supplier. At 1018, totes are loaded with items. At this point, each item may be associated with a tote, indicating that particular items are in particular totes. The time/date of the loading is also recorded, as well as the weight and other characteristics of the load. At 1020, multiple totes are loaded onto pallets, and the totes may be associated with the pallets. The time/date of pallet loading may also be recorded. At 1022, palletized shipments may be stored temporarily before shipment. The time/date of entry into storage may be recorded, as well as the time/date of removal from storage and temperature of storage. Alerts may be generated if there is a high inventory or if an item is in storage for an extended period. This allows the supplier to guard against spoilage.

At 1024, the palletized shipments are loaded into trailers through dock doors. At this point, each pallet may be associated with the trailer. The time/date of trailer loading and the time/date of trailer departure may be recorded. Additionally, the pallet may be associated with the destination and to the order number and shipment number. An alert may be generated if the pallet is placed in an incorrect trailer. It should be noted that there is no need to associate each item with the trailer. The items are associated with totes, which are associated with pallets, which are associated with trailers, and thus the SS or Data Center will be able to track the location of the item even though the tag attached to the item is not read at this point. At 1026, the shipment is intransit from the supplier to the distribution center. The temperature while in transit may be recorded if the trailer is equipped with electronic thermometer technology. The ETA at the distribution center may also be tracked, as well as the inventory and location of each trailer.

Referring to FIG. 10B, at 1028, the palletized shipment of loaded totes is received through the dock doors at the distribution center. The time/date of the pallet arrival may be recorded. At 1030, loaded pallets may be stored, thus tracking inventory, time/date of entry into storage, time/date of removal from storage, and storage temperature. Alerts may be generated if the item is in storage for an extended period, or if the temperature is outside a given range. At 1032, shipments may be split apart and regrouped based on retail destination. At this point, the tote and pallet are dis-associated, and the tote may be associated with a new pallet.

At 1034, the new pallets may be stored, recording inventory, time/date of entry into storage, time/date of removal from storage, and temperature of storage. Alerts may be generated if the item is in storage for an extended period, or if the temperature is inadequate. At 1036, the palletized shipments are loaded into trailers through dock doors for shipment to retail stores. The time/date of trailer loading may be recorded along with the time/date of trailer departure. Additionally, the pallet may be associated to the trailer, the destination, the order number, and the shipment number. An alert may be generated if the pallet is loaded into the wrong dock door. At 1038, the shipment is intransit from the distribution center to the retail center. The temperature while in transit may be recorded if the trailer is equipped with electronic thermometer technology. The ETA at the retail center may also be tracked, as well as the inventory and location of each trailer.

At 1040, a palletized shipment of loaded totes is received through dock doors at the retail store. The time/date of the arrival of each pallet may be recorded. At 1042, the loaded pallets may be temporarily stored upon receipt, recording the inventory, time/date of entry into storage, time/date of removal from storage, and the temperature of the storage. Alerts may be generated if the items are in storage for an extended period or if the temperature is inadequate. At 1044, the items may be placed on the retail floor, and at 1046 the used totes may be loaded into trailers to be shipped at 1048.

Reports may be generated automatically, or on demand for each of the three users, the container leasing company, the supplier, and the grocer. The container leasing company may view inventory (by tote type, location, customer), lost totes, performance metrics such as tote utilization (totes in use vs. totes in storage) and length of average tote turn by customer, and tote fleet statistics such as average age and average number of turns. The supplier may view inventory by item and status, as well as a shipment activity report. The grocer may view inventory of items or totes, including whether they are in use or ready for return, item history, as well as a shipment activity report.

Example #2

Automotive Supply Chain

In this example the system operates within the automotive industry to track direct material shipments from a supplier to a factory using reusable containers owned by the factory. Participants in this embodiment include a supplier, who provides automotive part to the factory, and the factory, which manufactures automobiles. The factory may have a production manager, who is responsible for the production line, and an equipment manager, who is responsible for company-owned equipment, including the reusable containers. Assets to be tracked through the automotive supply chain include raw materials such as sheet metal or plastic, components such as seat belts, bumpers, or cradles, component assemblies such as dashboard assemblies or engine blocks, and finished goods such as automobiles or trucks. The conveyances used include reusable plastic containers, cardboard containers, pallets, metal bins, metal racks, trailers, and rail cars.

Figure 11:
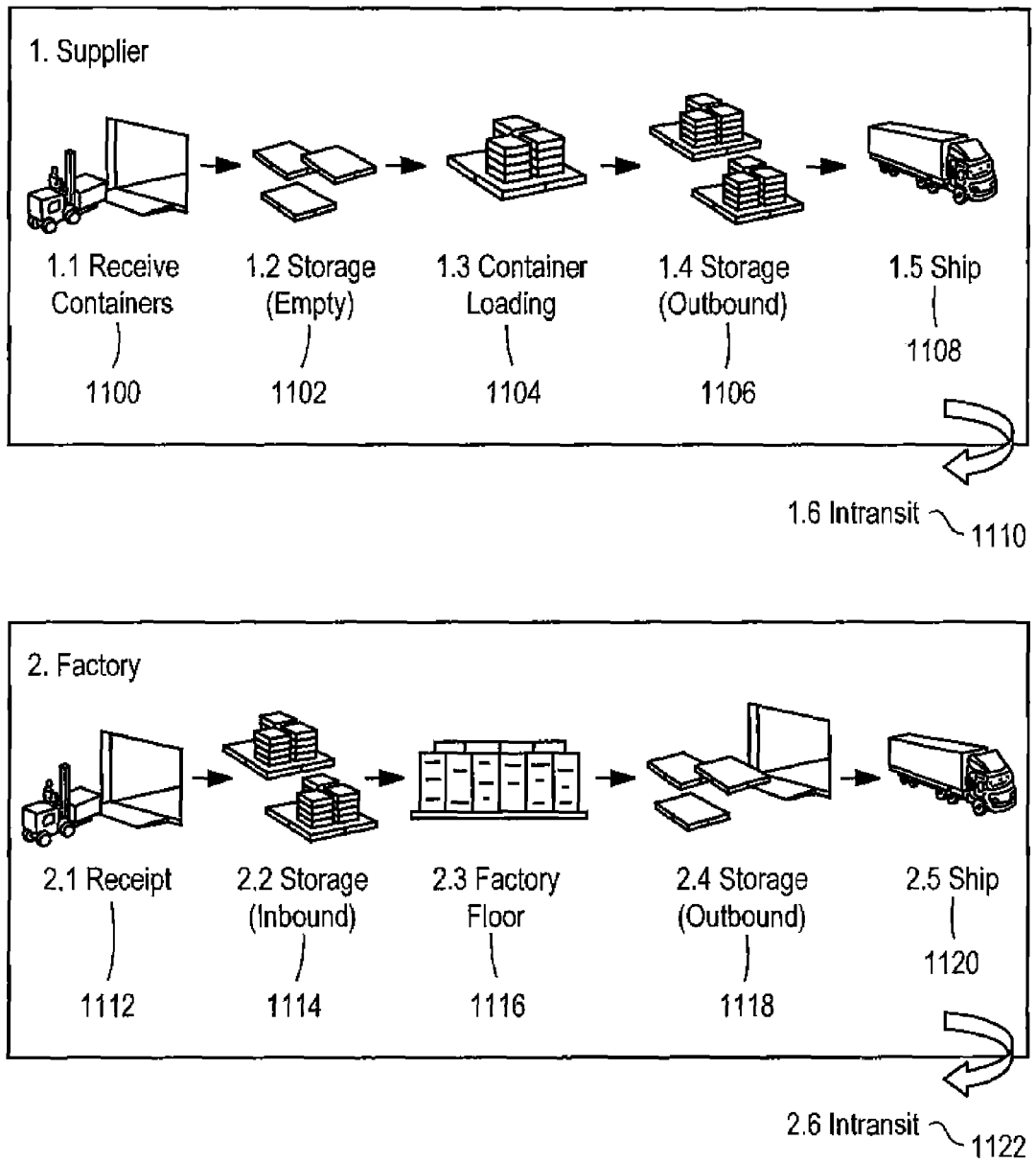
FIG. 11 is a diagram illustrating an automotive supply chain in accordance with a specific embodiment of the present invention.

FIG. 11 is a diagram illustrating an automotive supply chain in accordance with a specific embodiment of the present invention. At 1100, empty containers are received at the supplier through a dock door or rail platform. The time/date of the container arrival may be recorded and forwarded to the SS. At 1102, empty containers may sit in inventory until needed. The container inventory may be tracked and if inventory is too high, an alert may be generated. At 1104, containers are loaded with items (parts). At this point the items may be associated with containers, and the time/date of container loading recorded. At 1106, after loading, containers may be put into storage. The container/item inventory may be recorded and high or low inventory may generate an alert. At 1108, the containers may be shipped out through a dock door or rail platform. The containers may be associated with a customer order. The time/date of shipment, destination, and transport method may be recorded. Additionally, the container may be associated with the trailer or rail car. At 1110, the containers may be intransit from the supplier to the manufacturer. Intransit inventory, location, and ETA may be tracked using GPS or similar technologies.

At 1112, the shipment of loaded containers is received through a rail platform or dock doors at a factory. The time/date of the container arrival may be recorded and forwarded to the SS at the factory. At 1114, loaded containers may be temporarily stored upon receipt. Inventory, time/date of entry into storage, and time/date of removal from storage may all be tracked. At 1116, containers are moved to the factory floor, at which point their contents are unloaded. The time/date of the container movement may be recorded, and the items may be dis-associated from the container. At 1118, the container may be temporarily stored at the factory. The container inventory, time/date of entry into storage, and time/date of removal from storage may be tracked. High inventory may generate an alert. At 1120, empty containers are shipped through dock doors or via rail platform back to the supplier. The time/date of container shipment, destination of the container, and transport method for shipment may all be recorded. The containers may be associated with the trailer or rail car. At 1122, the containers are intransit from the factory to the supplier and the inventory, location, and ETA may be tracked via GPS or similar technologies.

Reports may be generated automatically, or on demand from any of the three users, the supplier, the equipment manager at the factory or the production manager at the factory. The supplier may view container inventory at storage in the supplier's facility or the manufacturer's facility, as well as shipment reports showing the intransit duration. The equipment manager may view lost container as well as performance metrics, such as container utilization, length of average container turn around by the factory, and analysis of transportation method used. Also, the equipment manager may view container fleet statistics, such as fleet size, average age, and average number of turns. The production manager may view item inventory in the factory or intransit.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for the real-time tracking of goods in a supply chain, including:
    affixing a tag to each good to be tracked;
    marking a location of one of the goods at a data appliance and storing information on said location at a site server coupled to said data appliance;
    uploading said information to a data center, said data center coupled to said site server;
    compensating for missing information by using a previous tag read and a current tag read; and
    charging users of said supply chain a fee dependent on the number of tracked goods to access said data center and view reports compiled using said location information regarding each tracked good.

2. The method of claim 1, further including aggregating at least two of said goods into a conveyance at a data point and wherein said marking includes indicating an aggregation event occurred at said data point.

3. The method of claim 2, wherein said marking further includes performing aggregation-by-inference, wherein an aggregation event occurring at said location for said conveyance automatically indicates that said conveyance has been completely filled with goods.

4. The method of claim 2, further including performing de-aggregation-by-inference at a second data point, wherein a de-aggregation event indicating that all items have been removed from said conveyance is generated.

5. The method of claim 1, wherein said tag affixed to said one of the goods is a Radio Frequency Identification (RFID) tag and said marking includes scanning said tag affixed to said one of the goods using an RFID reader.

6. The method of claim 1, wherein said one of the goods is stored in a conveyance, and said marking includes scanning said tag affixed to said conveyance using a reader.

7. The method of claim 1, wherein said marking includes scanning a tag using a tag reader.

8. The method of claim 7, wherein said tag reader is coupled to a data appliance.

9. The method of claim 7, wherein said tag reader is part of a data appliance.

10. The method of claim 1, wherein said marking includes tracking said one of the goods using global positioning satellite (GPS) technology.

11. The method of claim 1, wherein said storing utilizes the Universal Data Appliance Protocol (UDAP) to communicate said location information from said data appliance to said site server.

12. The method of claim 1, further including accessing said data center and viewing said reports.

13. The method of claim 1, further including aggregating a good into a conveyance when said good is loaded into said conveyance and de-aggregating said good from said conveyance when said good is unloaded from said conveyance.

14. The method of claim 1, wherein said compensating includes detecting that a missing tag read occurred by learning that a tag read was made on said one of the goods at a first location and at a third location, but not at a second location, wherein said one of the goods could not arrive at said third location without first passing through said second location.

15. The method of claim 1, further including filtering out any duplicative tag reads.

16. A computer-implemented meted for the real-time tracking of goods in a supply chain, including:
affixing a tag to each good to be tracked;
marking a location of one of the goods at a data appliance and storing information on said location at a site server coupled to said data appliance;
uploading said location information to a data center, said data center coupled to said site server;
compensating for missing information by using a previous tag read and a current tag read; and
charging users of said supply chain a fee per transaction to access said data center and view information regarding each tracked good, each transaction including a single tag read.

17. The method of claim 16, further including aggregating at least two of said goods into a conveyance at a data point and wherein said marking includes indicating an aggregation event occurred at said data point.

18. The method of claim 17, wherein said marking further includes performing aggregation-by-inference, wherein an aggregation event occurring at said location for said conveyance automatically indicates that said conveyance has been completely filled with items.

19. The method of claim 17, further including de-aggregation-by-inference at a second data point, wherein a de-aggregation event indicating that all items have been removed from said conveyance is generated.

20. The method of claim 16, wherein said tag affixed to said one of the goods is a Radio Frequency Identification (REID) tag and said marking includes scanning said tag affixed to said one of the goods using an RFID reader.

21. The method of claim 16, wherein said one of the goods is stored in a conveyance, and said marking includes scanning said tag affixed to said conveyance using a reader.

22. The method of claim 16, wherein said marking includes scanning a tag using a tag reader.

23. The method of claim 22, wherein said tag reader is coupled to said data appliance.

24. The method of claim 22, wherein said tag reader is part of said data appliance.

25. The method of claim 16, wherein said marking includes tracking said one of the goods using global positioning satellite (GPS) technology.

26. The method of claim 16, wherein said storing utilizes the Universal Data Appliance Protocol (UDAP) to communicate location information from said data appliance to said site server.

27. The method of claim 16, further including said accessing said data center and viewing reports.

28. The method of claim 16, further including aggregating a good into a conveyance when said good is loaded into said conveyance and de-aggregating said good from said conveyance when said good is unloaded from said conveyance.

29. The method of claim 16, wherein said compensating includes detecting that a missing tag read occurred by learning that a tag read was made on said one of the goods at a first location and at a third location, but not at a second location, wherein said one of the goods could not arrive at said third location without first passing through said second location.

30. The method of claim 28, further including filtering out any duplicative tag reads.

31. A system for real-time tracking of goods in a supply chain, including:
a data center comprising compensation logic;
a site server coupled to said data center;
a data appliance coupled to said site server; and
at least one tag, each tag affixed to a good in a way such that each tag is readable by a tag reader coupled to said data appliance;
wherein said compensation logic compensates for missing information by using a previous tag read and a current tag read, and users are charged a fee per good tracked to access said data center and view reports compiled using location information regarding each tracked good.

32. The system of claim 31, wherein said at least one tag and said tag reader utilize Radio Frequency Identification (RFID) technology.

33. The system of claim 31, further including an Intransit Data Appliance (IDA) and an Enterprise Server, said Enterprise Server coupled to said data center and said IDA coupled to said Enterprise Server to transmit data on a location of a good using Global Positioning Satellite (GPS) technology.

34. A system for real-time tracking of goods in a supply chain, including:
a data center comprising compensation logic;
a site server coupled to said data center;
a data appliance coupled to said site server;
at least one tag, each tag affixed to a good in a way such that each tag is readable by a tag reader coupled to said data appliance; and
wherein said compensation logic compensates for missing information by using a previous tag read and a current tag read, and users are charged a fee per transaction to access said data center and view reports compiled using location information regarding tracked goods, each of said transactions including a tag read.

35. The system of claim 34, wherein said at least one tag and tag reader utilize Radio Frequency Identification (RFID) technology.

36. The system of claim 34, further including an Intransit Data Appliance (IDA) and an Enterprise Server, said Enterprise Server coupled to said data center and said IDA coupled to said Enterprise Server to transmit data on a location of a good using Global Positioning Satellite (GPS) technology.

37. A system for real-time tracking of goods in a supply chain, including:
- a collaboration center;
- a data center comprising compensation logic, coupled to said collaboration center;
- a site sever coupled to said data center;
- a data appliance coupled to said site sever;
- at least one tag, each tag affixed to a good in a way such that each tag is readable by a tag reader coupled to said data appliance; and
- wherein said compensation logic compensates for missing information by using a previous tag read and a current tag read, and users are charged a fee per good tracked to access said data center and view location information regarding each tracked good.

38. The system of claim 37, wherein said at least one tag and said tag reader utilize Radio Frequency Identification (RFID) technology.

39. The system of claim 37, further including an Intransit Data Appliance (IDA) and an Enterprise Server, said Enterprise Server coupled to said data center and said IDA coupled to said Enterprise Server to transmit data on a location of a good using Global Positioning Satellite (GPS) technology.

40. A system for real-time tracking of goods in a supply chain, including:
- a collaboration center;
- a data center comprising compensation logic coupled to said collaboration center;
- a site server coupled to said data center;
- a data appliance, coupled to said site server;
- at least one tag, each tag affixed to a good in a way such that each tag is readable by a tag reader coupled to said data appliance; and
- wherein said compensation logic compensates for missing information by using a previous tag read and a current tag read, and users are charged a fee per transaction to access said data center and view reports compiled using location information regarding tracked goods, each of said transactions including a tag read.

41. The system of claim 40, wherein said at least one tag and said tag reader utilize Radio Frequency Identification (RFID) technology.

42. The system of claim 40, further including an Intransit Data Appliance (IDA) and an Enterprise Server, said Enterprise Server coupled to said data center and said IDA coupled to said Enterprise Server to transmit data on a location of a good using Global Positioning Satellite (GPS) technology.

43. A program storage device readable by a machine, tangibly embodying a program of instructions executable by the machine to perform a method for the real-time tracking of goods in a supply chain, the method including:
- affixing a tag to each good to be tracked;
- marking a location of one of the goods at a data appliance and storing information on said location at a site server coupled to said data appliance;
- uploading said location information to a data center, said data center coupled to said site server;
- compensating for missing information by using a previous tag read and a current tag read; and
- charging users of said supply chain a fee dependent on the number of tracked goods to access said data center and view reports compiled using location information regarding each tracked good.

44. A program storage device readable by a machine, tangibly embodying a program of instructions executable by the machine to perform a method for the real-time tracking of goods in a supply chain, the method iucluding:
- affixing a tag to each good to be tracked;
- marking a location of one of the goods at a data appliance and storing information on said location at a site server coupled to said data appliance;
- uploading said information to a data center, said data center coupled to said site server;
- compensating for missing information by using a previous tag read and a current tag read; and
- charging users of said supply chain a fee per transaction to access said data center and view information regarding each tracked good, each transaction including a single tag read.

45. The system of claim 31, wherein said site server is configured to aggregate at least two of said goods into a conveyance at a data point and indicate an aggregation event.

46. The system of claim 45, wherein said site server is further configured to perform aggregation-by-inference, wherein an aggregation event automatically indicates that said conveyance has been completely filled with goods.

47. The method of claim 1, wherein said compensating comprises compensating for missing information about said one of the goods by using aggregation information derived from a previous tag read and a current tag read to create a missing tag read for said one of the goods.

48. The method of claim 1, wherein said compensating comprises compensating for missing information about a second location by using location information from a previous tag read at a first location with location information from a current tag read at a third location to create a missing tag read for said one of the goods at the second location.

49. The method of claim 1, further comprising:
- receiving the missing information subsequent to the compensating; and
- replacing compensated information with the missing information.

* * * * *

UNITED STATES PATENT AND TRADEMARK OFFICE
CERTIFICATE OF CORRECTION

PATENT NO. : 7,136,832 B2  Page 1 of 1
APPLICATION NO. : 09/849510
DATED : November 14, 2006
INVENTOR(S) : Xi Li et al.

It is certified that error appears in the above-identified patent and that said Letters Patent is hereby corrected as shown below:

Claim 16, Col. 27, Line 36, please delete "meted" and insert -- method --.

Claim 20, Col. 27, Line 66, please delete "(REID)" and insert -- (RFID) --.

Claim 28, Col. 28, Line 19, please insert a space before "further".

Claim 35, Col. 29, Line 4, please insert -- said -- after "and".

Claim 37, Col. 29, Line 17, please delete "sever" and insert -- server --.

Claim 37, Col. 29, Line 18, please delete "sever" and insert -- server --.

Claim 40, Col. 29, Line 42, please delete "," after "appliance".

Signed and Sealed this

Thirteenth Day of February, 2007

JON W. DUDAS
*Director of the United States Patent and Trademark Office*